(12) United States Patent
Bhattacharjee et al.

(10) Patent No.: US 9,603,097 B2
(45) Date of Patent: Mar. 21, 2017

(54) DEVICE, METHOD, AND APPARATUS FOR OFFLINE DISCONTINUOUS RECEPTION (DRX) PROCESSING WITH ONLINE TRIGGERS IN CELLULAR SYSTEMS

(75) Inventors: Supratik Bhattacharjee, San Diego, CA (US); Brian C. Banister, San Diego, CA (US); Shivratna G. Srinivasan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 12/494,157

(22) Filed: Jun. 29, 2009

(65) Prior Publication Data

US 2010/0330992 A1     Dec. 30, 2010

(51) Int. Cl.
*H04W 36/06*     (2009.01)
*H04W 52/02*     (2009.01)
*H04W 68/00*     (2009.01)
*H04W 76/04*     (2009.01)

(52) U.S. Cl.
CPC .......... *H04W 52/028* (2013.01); *H04W 68/00* (2013.01); *H04W 76/048* (2013.01)

(58) Field of Classification Search
USPC .......................... 370/320, 342; 455/458, 436
See application file for complete search history.

(56) References Cited

U.S. PATENT DOCUMENTS

| | | | | |
|---|---|---|---|---|
| 7,787,892 | B2 * | 8/2010 | Yang et al. | 455/458 |
| 2001/0044313 | A1 * | 11/2001 | Abrishamkar | 455/458 |
| 2002/0123357 | A1 | 9/2002 | Abrishamkar et al. | |
| 2005/0032542 | A1 * | 2/2005 | Wilborn et al. | 455/525 |
| 2008/0214249 | A1 | 9/2008 | Kim et al. | |
| 2008/0293437 | A1 | 11/2008 | Ranganathan et al. | |
| 2010/0091693 | A1 * | 4/2010 | Pelletier | H04W 52/0216 370/311 |
| 2010/0110897 | A1 * | 5/2010 | Chun et al. | 370/241 |
| 2010/0184458 | A1 * | 7/2010 | Fodor et al. | 455/522 |
| 2010/0323631 | A1 * | 12/2010 | Martin | H04B 17/0067 455/67.11 |

(Continued)

FOREIGN PATENT DOCUMENTS

| | | |
|---|---|---|
| CN | 101243678 A | 8/2008 |
| JP | 2009010784 A | 1/2009 |

(Continued)

OTHER PUBLICATIONS

International Search Report and Written Opinion—PCT/US2010/040496, International Search Authority—European Patent Office—Sep. 24, 2010 (090875).

(Continued)

*Primary Examiner* — Yemane Mesfin
*Assistant Examiner* — Henry Baron
(74) *Attorney, Agent, or Firm* — Changwoo Yang

(57) ABSTRACT

An apparatus and method for processing signals are disclosed. The apparatus may include a transceiver configured to receive a first paging signal during a first cycle, a memory, and a processor configured to store the received first paging signal in the memory, to switch the transceiver to an off state after the first paging signal is stored in the memory, to process the stored first paging signal while the transceiver is in the off state, and to determine whether to enter an online mode based on the processing.

35 Claims, 19 Drawing Sheets

(56) References Cited

U.S. PATENT DOCUMENTS

2011/0269449 A1* 11/2011 Kazmi et al. ............. 455/422.1

FOREIGN PATENT DOCUMENTS

| WO | WO0022747 | 4/2000 |
|---|---|---|
| WO | WO2007021115 | 2/2007 |
| WO | WO2008016834 | 2/2008 |

OTHER PUBLICATIONS

CMCC,Discussion on notification mechanism for eMBMS,R2-093252,3GPP,May 8, 2009.
CMCC,Discussion on notification mechanism for eMBMS,R2-093521,3GPP,May 8, 2009.
Nokia Siemens Networks, Nokia,Further Issues with DL RS Initialization,R1-081860,3GPP,May 9, 2008.
Taiwan Search Report—TW099121281—TIPO—Apr. 22, 2013.

* cited by examiner

DEVICE, METHOD, AND APPARATUS FOR OFFLINE DISCONTINUOUS RECEPTION (DRX) PROCESSING WITH ONLINE TRIGGERS IN CELLULAR SYSTEMS

REFERENCE TO CO-PENDING APPLICATIONS FOR PATENT

The present application for patent is related to the following co-pending U.S. patent application:

"DEVICE, METHOD, AND APPARATUS FOR OFFLINE DISCONTINUOUS RECEPTION (DRX) PROCESSING IN CELLULAR SYSTEMS" by Supratik Bhattacharjee, et al., having Ser. No. 12/494,149, filed concurrently herewith, assigned to the assignee hereof, and expressly incorporated by reference herein.

BACKGROUND

Field

The following description relates generally to wireless communications, and more particularly to offline discontinuous reception (DRX) processing in a cellular system.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) systems, and orthogonal frequency division multiple access (OFDMA) systems.

Generally, a wireless multiple-access communication system can simultaneously support communication for multiple wireless terminals (e.g., access terminals, mobile stations, mobile devices, user equipment (UE)). Each terminal communicates with one or more base stations via transmissions on the forward and reverse links. The forward link (or downlink) refers to the communication link from the base stations to the terminals, and the reverse link (or uplink) refers to the communication link from the terminals to the base stations. The communication links may be established via a single-in-single-out, multiple-in-signal-out or a multiple-in-multiple-out (MIMO) system.

In a communication system, the network consists of several base stations, each one of which covers its respective area (e.g., cell) and communicates with one or more mobile devices. When there is an incoming voice or data call, a paging message is sent from a set of base stations where the network determines that the mobile device is likely to be present.

In a conventional paging procedure, two signals are used to convey the paging message. The first paging signal transmitted via Physical Downlink Control Channel (PDCCH) is used to indicate whether a paging message is being transmitted to a particular mobile device or group of mobile devices. The second paging signal transmitted via Physical Downlink Shared Channel (PDSCH) carries the paging message(s) (e.g., page payload) for the particular mobile device or group of mobile devices. The first paging signal and the second paging signal may be transmitted in the same subframe (e.g., paging occasion).

Typically, mobile devices utilize power (e.g., battery power) while turned on as well as during periods of communication with a base station and/or other mobile devices via the base station. The amount of power consumed by a mobile device can depend in part on the configuration of the mobile device and/or function (e.g., operation) being performed by the mobile device. Reducing the amount of power utilized by a mobile device is desirable as such reduction can result in extended battery life and decreased cost to use the mobile device and battery in addition to improved overall performance of the mobile device.

Typical mobile devices use Discontinuous Reception (DRX) in idle mode to reduce power consumption. When DRX is used, the mobile device monitors the first paging signal only at one paging subframe (e.g., paging occasion) per DRX cycle. The core network usually knows when the mobile terminal will be monitoring the first paging signal within the DRX cycle. Thus, if the network intends to page a particular mobile terminal, it sends the first paging signal at the time when the mobile terminal will be monitoring the paging channel. If the mobile terminal is not paged in the first paging signal, it goes back to the idle mode. Otherwise, the mobile terminal reads the second paging signal.

Typically, a mobile device implementing DRX would be required to bring an transceiver online and maintain it online in order to effectively perform the decoding and processing necessary to determine whether the received page is intended for the receiving mobile device or some other device. During this time, however, the transceiver of the mobile device can consume a significant amount of battery power. Accordingly, there exists a need for a system configuration that allows the mobile device to capture time domain (TD) samples (e.g., paging subframe) and shut off the transceiver as quickly as possible while performing the necessary DRX processing in idle mode. This would allow for lower current consumption during DRX processing, resulting in significant idle mode current savings.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect of the disclosure, a method for processing signals includes switching a transceiver of a mobile device to an on state, receiving a first paging signal via the transceiver during a first cycle, storing the received first paging signal in a memory of the mobile device, switching the transceiver to an off state, processing the stored first paging signal while the transceiver is in the off state, and determining whether to enter an online mode based on the processing.

According to another aspect of the disclosure, a wireless communication apparatus includes a transceiver configured to receive a first paging signal during a first cycle, a memory, and a processor configured to store the received first paging signal in the memory, to switch the transceiver to an off state after the first paging signal is stored in the memory, to process the stored first paging signal while the transceiver is in the off state, and to determine whether to enter an online mode based on the processing.

According to a further aspect of the disclosure, an apparatus includes means for switching a transceiver of a mobile device to an on state, means for receiving a first paging signal via the transceiver during a first cycle, means for storing the received first paging signal in a memory of the mobile device, means for switching the transceiver to an off state, means for processing the stored first paging signal while the transceiver is in the off state, and means for determining whether to enter an online mode based on the means for processing.

According to yet a further aspect of the disclosure, a computer program product includes a computer-readable medium including a first set of codes for causing a computer to switch a transceiver of a mobile device to an on state, a second set of codes for causing a computer to receive a first paging signal via the transceiver during a first cycle, a third set of codes for causing a computer to store the received first paging signal in a memory of the mobile device, a fourth set of codes for causing a computer to switch the transceiver to an off state, a fifth set of codes for causing a computer to process the stored first paging signal while the transceiver is in the off state, and a sixth set of codes for causing a computer to determine whether to enter an online mode based on the processing.

According to yet a further aspect of the disclosure, a wireless communications apparatus includes at least one processor configured to switch a transceiver of a mobile device to an on state, receive a first paging signal via the transceiver during a first cycle, store the received first paging signal in a memory of the mobile device, switch the transceiver to an off state, process the stored first paging signal while the transceiver is in the off state, and determine whether to enter an online mode based on the processing.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
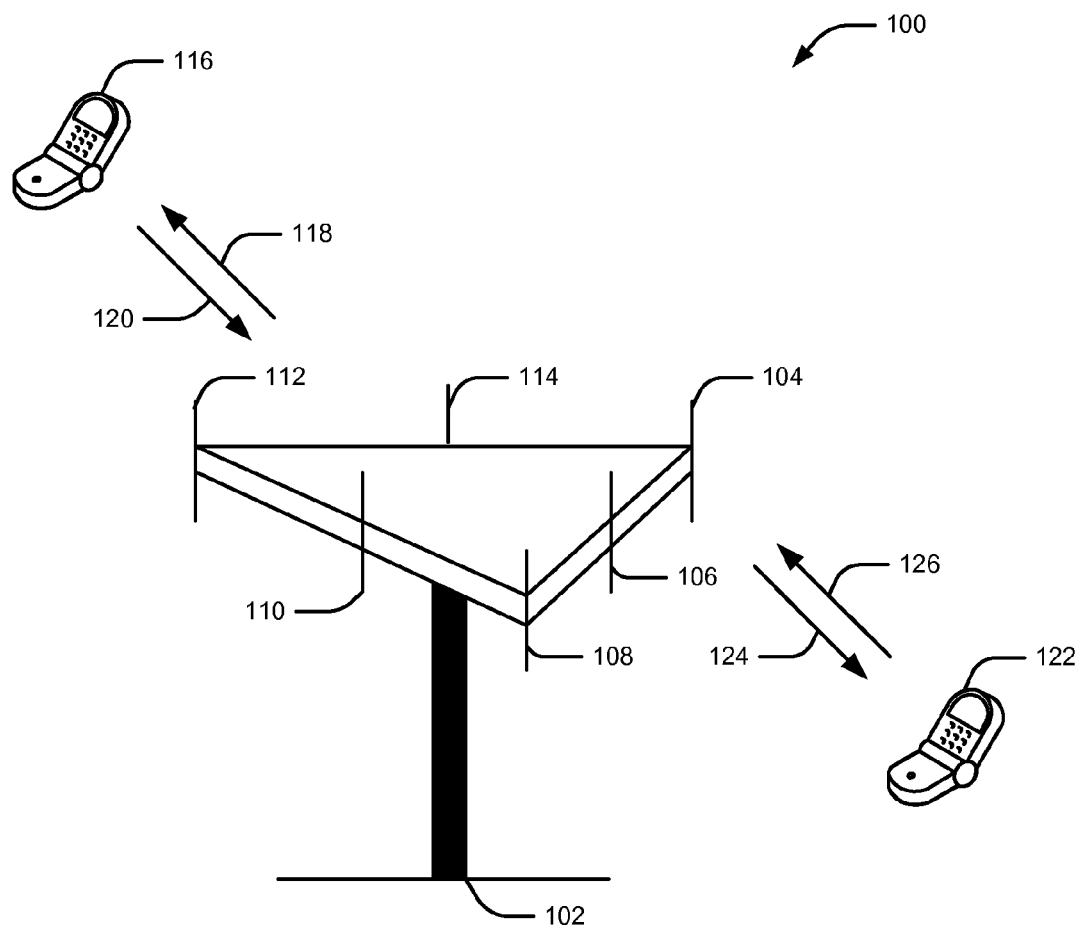
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various aspects presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices (e.g., 116) in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

In accordance with an aspect, a mobile device (e.g., 116) can be configured in a manner that allows it to perform DRX processing offline. In order to perform DRX processing offline, the mobile device 116 may need to be configured to meet the following requirements, which are applicable for Frequency Division Duplex (FDD) as well as Time Division Duplex (TDD): (1) mobile device may need to monitor one paging frame every DRX cycle; (2) within each paging frame, the mobile device may need to monitor one paging subframe; (3) within that paging subframe, the mobile device may need to monitor a Physical Downlink Control Channel (PDCCH) with one unique Paging Group Radio Network Temporary Identifier (P-RNTI); (4) if the mobile device is paged (PDCCH success) then the Physical Downlink Shared Channel (PDSCH) on that same paging subframe will carry the page information; (5) perform cell suitability check (S-criteria) evaluation for serving cell; (6) perform periodic and/or triggered neighbor cell detection; (7) perform measurement of neighbor cells based on measurement thresholds and perform cell re-selection evaluation as needed; (8) perform neighbor Packet Broadcast Channel (PBCH) decode as needed; (9) special handling if the mobile device encounters a Multi-Media Broadcast over a Single Frequency Network (MBSFN) subframe or an uplink (UL) subframe in case of TDD.

Furthermore, the mobile device may be configured to support a sufficient amount of memory to reconfigure TD and FD sample server in accordance with 3GPP LTE Release 8 design specifications, as well as design specifications based on specific performance requirements. In order to meet a paging timeline, the PDCCH carrying the P-RNTI and the PDSCH carrying the actual page payload may be required to be transmitted on the same paging subframe. This would allow the mobile device to perform offline DRX processing based on approximately 1 ms of TD samples covering the paging subframe. The mobile device may also be configured to measure all of the detected intra-frequency neighbor cells.

Figure 2:
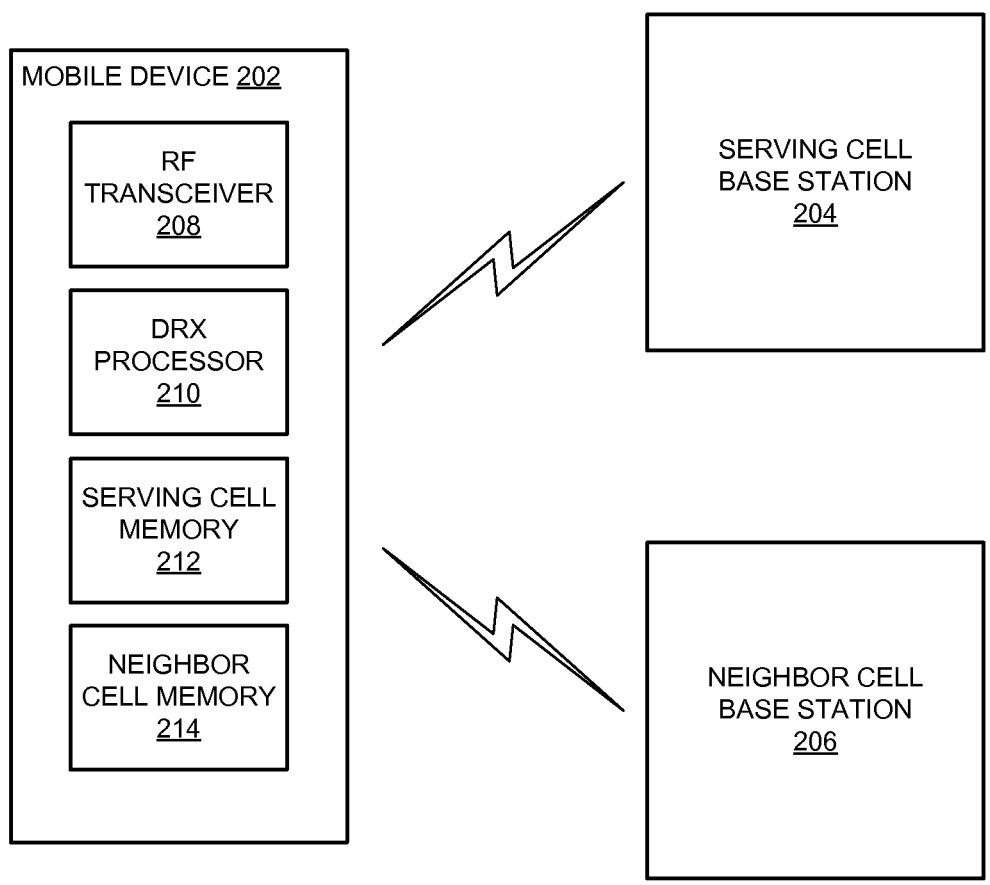
FIG. 2 is a block diagram of an example system that can facilitate offline DRX processing.

FIG. 2 is a block diagram of a system 200 that can facilitate offline DRX processing. As shown, the system 200 may include a mobile device 202, a serving cell base station 204, and a neighbor cell base station 206. Each of the serving and neighbor cell base stations 204 and 206 may communicate with the mobile device 202. The mobile device 202 may include an RF transceiver 208, a DRX processor 210, a serving cell memory 212, and a neighbor cell memory 214. The mobile device 202 may be configured to perform offline DRX processing.

The mobile device 202 can receive information, signals, data, instructions, commands, bits, symbols, and the like transmitted from both the serving cell base station 204 and the neighbor cell base station 206. The RF transceiver 208 may be configured to receive such signals, etc. For instance, the RF transceiver 208 may receive a signal from a receive antenna (not shown), and perform typical actions on the signal (e.g., filter, amplify, downconvert, demodulate) the received signal and digitize the signal to obtain samples. The DRX processor 210 facilitates DRX processing while the mobile device 202 is offline. While the mobile device 202 is in idle state, the RF transceiver 208 may be off so as not to consume any battery power. Every DRX cycle, the RF transceiver 208 may wake up to capture time domain (TD) samples transmitted by the serving cell base station 204 and the neighbor cell base station 206. Once the RF transceiver captures the samples and performs the processing to convert the samples into digital form for storage, the DRX processor 210 stores the captured samples in memory. Specifically, the sample from the serving cell base station 204 may be stored in the serving cell memory 212, and the sample from the neighbor cell base station 206 may be stored in the neighbor cell memory 214. It should be noted that the serving cell memory 212 and the neighbor cell memory 214 may be either physically separate components from the DRX processor 210 or integrated in the form of buffers into the DRX processor architecture. Once the samples are captured and stored in their respective memories, the RF transceiver may shut down (i.e., go offline) so as not to consume any additional current. At this point, the DRX processor 210 may remain online and proceed to perform the necessary processing to determine whether the captured samples are paging signals intended for the mobile device 202, and if so to demodulate the payload of the paging signal.

Figure 3:
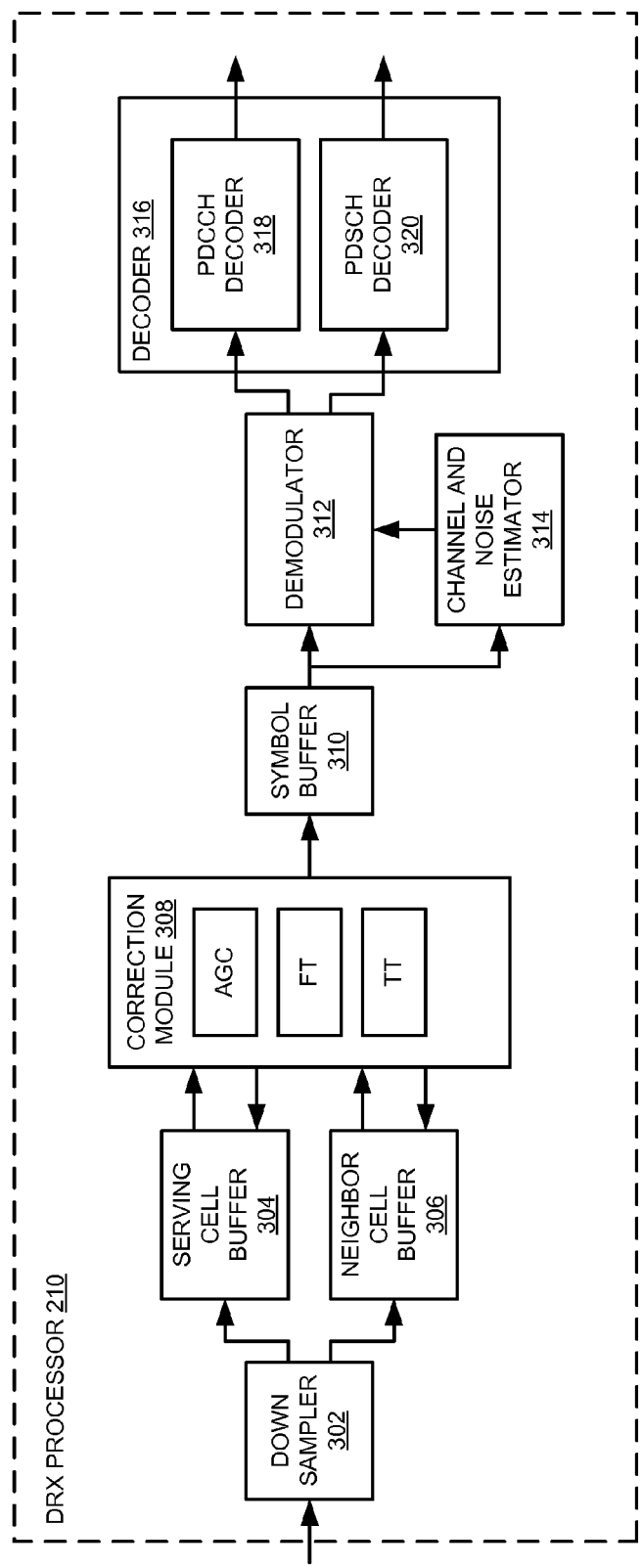
FIG. 3 is a block diagram of an example DRX processor.

FIG. 3 is a block diagram of the DRX processor 210 of FIG. 2. As shown in FIG. 2, the DRX processor 210 may include a down sampler 302 coupled to a serving cell buffer 304 and a neighbor cell buffer 306, which may correspond to the serving cell memory 212 and the neighbor cell memory 214 of FIG. 2, respectively. The DRX processor 210 may further include a correction module 308, a symbol buffer 310, a demodulator 312, a channel and noise estimator 314, and a decoder 316, which itself may include a PDCCH decoder 318 and a PDSCH decoder 320.

During operation, when the DRX processor 210 receives a signal, it may be transmitted to the down sampler 302. The down sampler 302 may be configured to sample the signal at a specific frequency in order to optimize the received signal. The down sampled signal may then be transmitted to and captured within either the serving cell buffer 304 or the neighbor cell buffer 306 depending on whether the sample is from the serving cell base station 204 or the neighbor cell base station 206. This distinction is characterized by the different bandwidths of the respective cells. The samples are captured at least at the rate of the bandwidth of the respective cells. The bandwidth of the serving cell base station 204 is typically known and can range from 1.92 MHz to 30.72 MHz, for example. Any signal samples from the serving cell base station 204 are captured at a frequency that corresponds to the specific bandwidth of the serving cell base station 204. The captured serving samples are then stored in the serving cell buffer 304. Because the bandwidth of the neighbor cell may be unknown, the signal samples from the neighbor cell base station 206 are captured at a specific frequency, at least at 1.92 MHz, for example. The neighbor cell samples may then be stored in the neighbor cell buffer 306. The DRX processor 210 may be configured to capture from 1 ms to 2 ms worth of serving and neighbor cell samples, for example. This capture duration may be varied in order to optimize and balance the performance gain of DRX processing and the power consumption of the RF transceiver 208. As an example, for optimum performance, the DRX processor 210 may be configured to capture 1.2 ms worth of cell signals.

In order to ensure proper capture of the paging subframe, the DRX processor 210 may be configured to align the start of the sample capture duration with the start of the paging subframe or slightly before the paging subframe, and align the end of the capture duration with a point slightly after the paging subframe. Capturing a few symbols (e.g., 2) of a subframe prior to the paging subframe and the subframe after the paging subframe would allow the DRX processor 210 to determine whether either of the subframes straddling the paging subframe is a Multimedia Broadcast Single Frequency Network (MBSFN) subframe, an uplink TDD subframe, or a Blanking subframe. If the DRX processor 210 determines that either the earlier subframe and/or the later subframe is an MBSFN, uplink TDD, or a Blanking subframe, then it may avoid capturing any additional symbols from the earlier and/or later subframe.

Configuration of the serving cell buffer 304 and the neighbor cell buffer 306 may vary depending on the particular balance between the DRX processing performance and the storage capacity for the serving and neighbor cell samples. It should be noted that the serving cell buffer 304 and the neighbor cell buffer 306 may be utilized by the mobile device 202 for purposes other than storing serving cell samples and neighbor cell samples in idle mode. The buffers 304 and 306 may, for example, be used as general purpose buffers/memory during continuous traffic operation of the mobile device 202. During offline DRX processing, the memory of buffers 304 and 306 is reconfigured to be reused for the purpose of capturing and storing serving and neighbor cell samples. This memory reuse scheme allows for a more efficient allocation of memory resources of the mobile device 202 without adding any additional memory for offline DRX processing. The buffers 304 and 306 may be reconfigured in any way suitable for a particular scenario requiring a specific balance between offline DRX processing performance and memory capacity.

As shown in FIG. 3, the respective outputs from the serving cell buffer 304 and the neighbor cell buffer 306 may be provided to the correction module 308, which may perform Automatic Gain Control (AGC) processing, frequency tracking, time tracking, as well as Fast Fourier Transform (FFT) on the captured serving cell and the neighbor cell samples. The performance of the correction module is explained in greater detail with reference to FIGS. 4 and 5.

Figure 4:
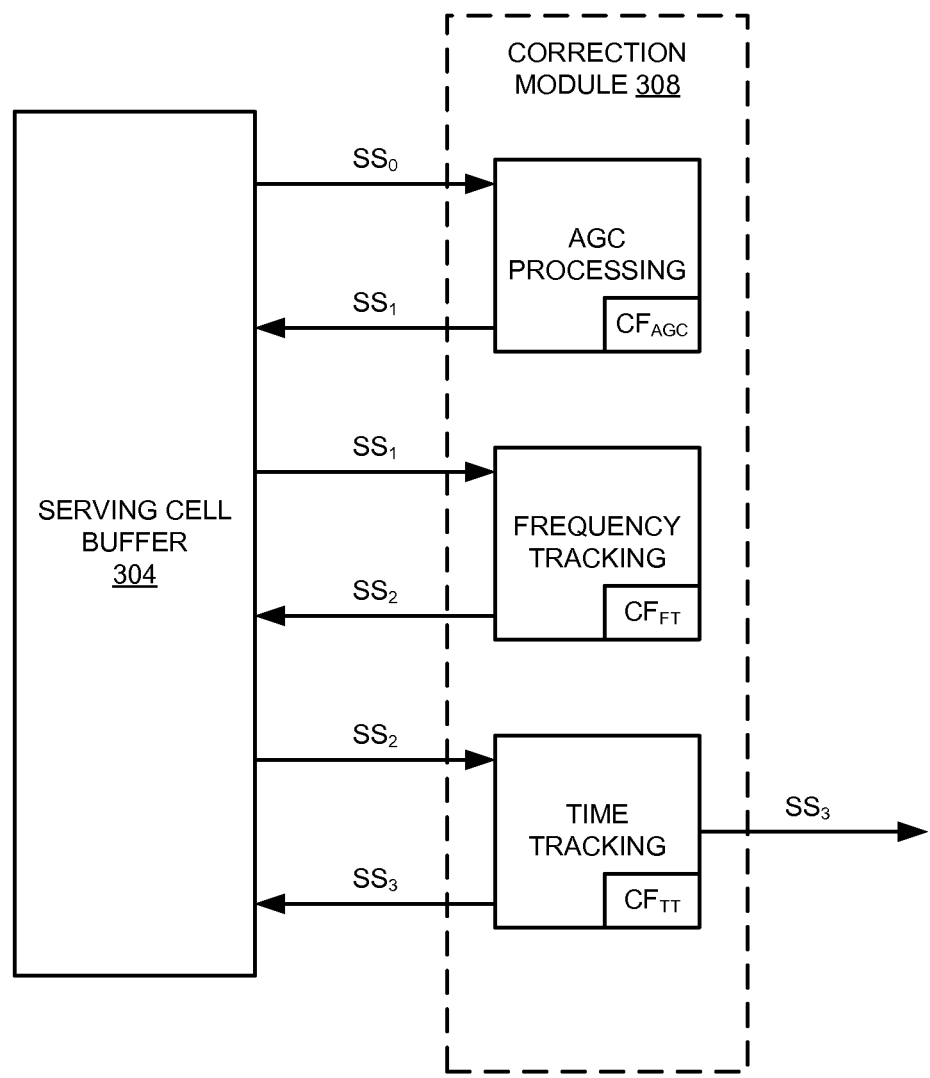
FIG. 4 is a block diagram of an example correction module of the DRX process for a serving sample.
Figure 5:
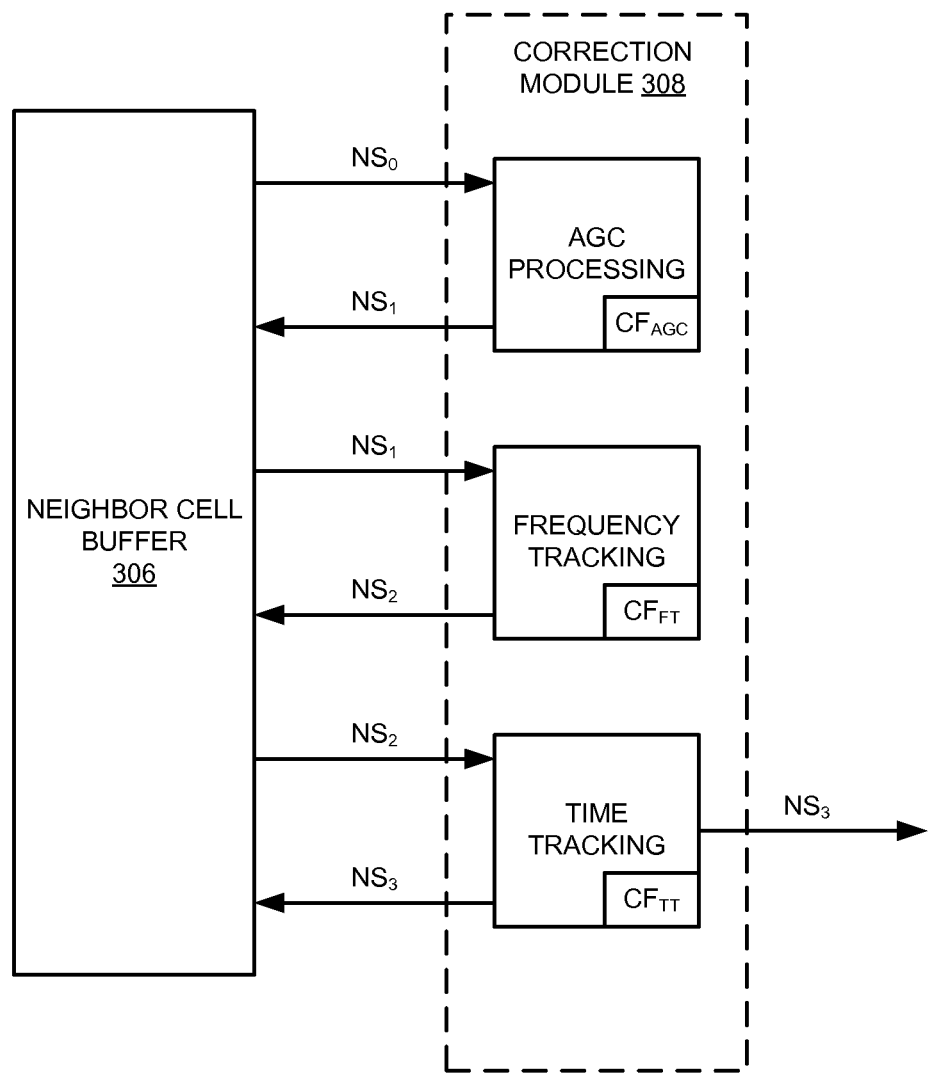
FIG. 5 is a block diagram of an example correction module of the DRX process for a neighbor sample.

As shown in FIGS. 4 and 5, the correction module 308 receives outputs from and transmits outputs to the serving and neighbor cell buffers 304 and 306. After the serving samples and neighbor samples are captured and stored in the respective buffers 304 and 306, the correction module 308 is configured to perform a sequence of corrections on the serving and neighbor samples in order to prepare them for channel estimation. These correction processes include, but are not limited to, AGC processing, frequency tracking, and time tracking. Referring to FIG. 4, the correction module 308 may receive the captured sample $SS_0$ and may first perform AGC processing on the sample $SS_0$.

The AGC processing may include two processes, a Low Noise Amplifier (LNA) gain update and a Digital Variable Gain Amplifier (DVGA) gain update. Both the LNA gain update and the DVGA gain update are based on the captured serving sample and may be implemented using a non Primary Broadcast Channel (PBCH) mode AGC block in a Fast Fourier Transform Engine (FFTE). The number of FFTs used to compute an energy estimate may be set to four, covering a middle ⅓ ms of the paging subframe within the captured serving sample $SS_0$. A filtering coefficient may be set to 0 in order to obtain an instantaneous LNA gain estimate and an instantaneous DVGA gain estimate. The LNA gain estimate computed from the serving sample $SS_0$ in the present DRX cycle N may be stored as a LNA correction factor $CF_{AGC}$ and applied to a serving sample captured during the next DRX cycle N+1. The serving sample $SS_0$, however, will be processed with an LNA correction factor $CF_{AGC}$ derived from a previous serving sample during the DRX cycle N−1. The DVGA gain estimate computed from the serving sample $SS_0$ in the present DRX cycle N may be stored as a DVGA correction factor $CF_{AGC}$ and applied to the present serving sample $SS_0$ of DRX cycle N. After undergoing AGC processing, the serving sample will be transmitted back to the serving cell buffer 304 as an updated serving sample $SS_1$.

Once the AGC processing is complete, the correction module 308 will retrieve the updated serving sample $SS_1$ and estimate its frequency error via frequency tracking (e.g., angle of rotation estimation). This process may involve executing a joint loop (e.g., a combination of an outer and inner loop). Appropriate weighting of each loop may be determined as a function of DRX cycle length, reference signal received power (RSRP) etc. It should be noted that RSRP measurements may be derived from the time domain Channel Impulse Response (CIR) energy based on the captured serving sample. The frequency update is based on the updated serving sample $SS_1$ and may be executed after the DVGA gain estimate is computed, and as such, may utilize the DVGA gain estimate for a more accurate estimate of the frequency error. The frequency error computed from the serving sample $SS_1$ in the present DRX cycle N may be stored as a correction factor $CF_{FT}$ and applied to the serving sample $SS_1$ during the same DRX cycle N. After undergoing the frequency tracking process, the serving sample will be transmitted back to the serving cell buffer 304 as an updated serving sample $SS_2$.

Once the frequency tracking process is complete, the correction module 308 will retrieve the updated serving sample $SS_2$ and estimate its timing error via time tracking. This process may also involve executing a joint loop. Appropriate weighting of each loop may be determined as a function of DRX cycle length, RSRP etc. This timing update is based on the updated serving sample $SS_2$ and may be executed after the frequency error is computed, and as such, may utilize the frequency error for a more accurate estimate of the timing error. The timing error computed from the serving sample $SS_2$ may be stored as a correction factor $CF_{TT}$. Whether the correction factor $CF_{TT}$ is applied to the serving sample $SS_2$ in the present DRX cycle N or a serving sample $SS_2$ in the next DRX cycle N+1 depends on whether the computed timing error of the serving sample $SS_2$ exceeds a predetermined threshold. In particular, if the computed timing error of the serving sample $SS_2$ exceeds the threshold, then the correction factor $CF_{TT}$ is applied to the serving sample $SS_2$ in the present DRX cycle N. On the other hand, if the computed timing error of the serving sample $SS_2$ is less than or equal to the threshold, then the correction factor $CF_{TT}$ is applied to the serving sample $SS_2$ in the next DRX cycle N+1. As such, the serving sample $SS_2$ may be processed with the correction factor $CF_{TT}$ derived from the present serving sample $SS_2$ during the same DRX cycle N or a previous serving sample derived during DRX cycle N−1. Either way, after undergoing the time tracking process, the serving sample will be transmitted back to the serving cell buffer 304 as a final corrected serving sample $SS_3$. The final corrected serving sample $SS_3$ may then be forwarded from the serving cell buffer 304 to the symbol buffer 310, or, alternatively may be transmitted directly from the correction module 308 to the symbol buffer 310 for channel estimation and demodulation.

As shown in FIG. 5, the correction module 308 may process the captured neighbor sample $NS_0$ in a manner similar to that of the serving sample $SS_0$, as discussed with reference to FIG. 4. The difference between the neighbor sample processing and the serving sample processing lies in that the AGC processing of the neighbor sample $NS_0$ does not include the computation of a new correction factor $CF_{AGC}$, but performs the LNA gain update and the DVGA gain update processing on the neighbor sample $NS_0$ using the correction factor $CF_{AGC}$ computed for the serving sample $SS_0$ during the present DRX cycle N.

The output of the correction module 308 may be provided to the symbol buffer 310, which may be configured to store OFDM symbols for transmission to the demodulator 312 and the channel and noise estimator 314. The estimator 314 may be configured to receive the output of the symbol buffer 310 and to estimate the channel quality and noise using a received pilot signal, and output the resulting signal to the demodulator 312. It should be noted that the channel quality and noise estimate may be performed twice if a timing correction was performed during the present DRX cycle N. The demodulator 312 may be configured to separately demodulate the paging signal received across the PDCCH channel and the paging signal received across PDSCH channel based on the output from the estimator 314. The demodulator 312 may then transmit the demodulated PDCCH and PDSCH signals to the PDCCH decoder 318 and the PDSCH decoder 320, respectively. The decoders 318 and 320 are configured to reconstruct the encoded paging signals that indicate whether the paging signals are intended for the mobile device 202 and whether the mobile device 202 should transition from the offline state to an online state and activate the RF transceiver. The decoders 318 and 320 may then transmit the decoded signals to other processing components of the mobile device 202 for performing the specific functions determined by the offline DRX processing.

In this manner of utilizing the serving cell and neighbor cell buffers 304 and 306, the mobile device 202 may perform a significant portion of DRX processing (e.g., AGC processing, frequency tracking, time tracking, channel and noise estimation, demodulation, and decoding) offline and in an efficient fashion.

Figure 6:
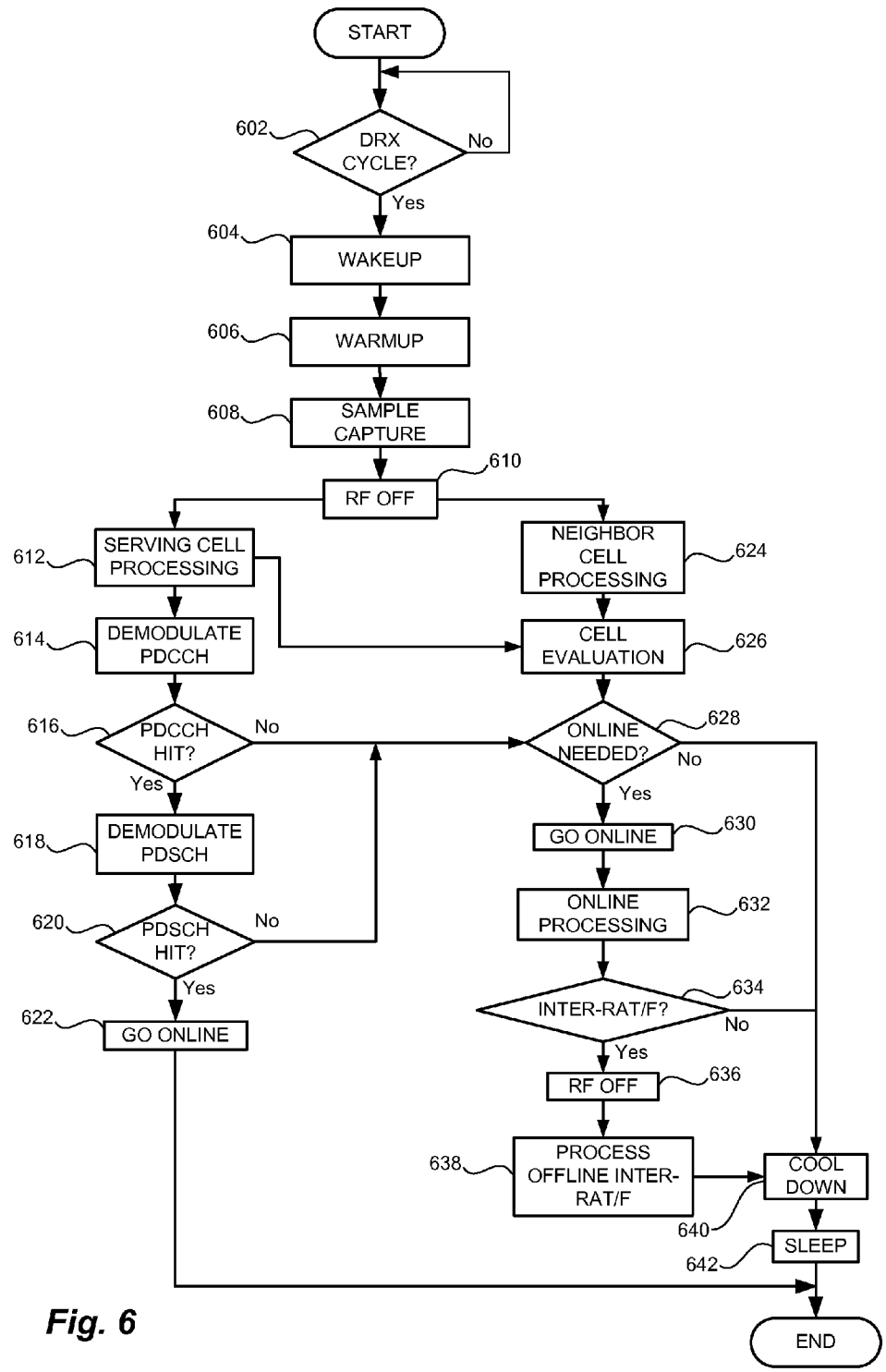
FIG. 6 is a flow chart depicting an example of an online stage in the offline DRX process.

FIG. 6 is a flow chart depicting an example of an offline DRX process 600 that may be executed by the mobile device 202. In block 602, a determination is made as to whether the DRX cycle length has almost lapsed and the mobile device 202, while still in idle mode, is ready to initialize the various key components (e.g., crystal oscillator clock, digital processing blocks, RF transceiver 208, DRX processor 210) to monitor for a paging signal. The mobile device 202 may include a sleep controller (not shown) that may be configured to serve as a counter for the DRX cycle length and initialize the mobile device 202 before the sample capture procedure. If the DRX cycle length has not yet been reached, then the process loops back until such a time. Otherwise, the process proceeds to block 604.

In block 604, the sleep controller wakes up and initializes the necessary clock for running the digital processing blocks, the RF transceiver 208, DRX processor 210, as well all of the other components necessary for performing DRX processing, such as the serving and neighbor cell buffers 304 and 306. Other hardware components that are not used for performing DRX processing may remain in a sleep state. The process continues to block 606.

In block 606, the RF transceiver 208 locks onto the carrier frequency of the anticipated paging signals, and the process proceeds to block 608.

In block 608, the DRX processor 210 may reconfigure the memory (e.g., serving cell buffer 304 and neighbor cell buffer 306) for storing serving cell and neighbor cell samples, and proceed to capture the serving cell and neighbor cell samples via the RF transceiver 208, and store the captured samples in the respective buffers 304 and 306. The process then proceeds to block 610.

In block 610, the DRX processor 210 turns off the RF transceiver 208 so as to not have it consume any additional current, and the process proceeds to blocks 612 and 624.

In block 612, the process may initialize the DRX processor 210 to perform serving cell processing on the serving cell sample stored in the serving cell buffer 304. Specifically, the serving cell processing may include AGC processing, frequency tracking, time tracking, channel estimation, and RSRP measurements.

Figure 7:
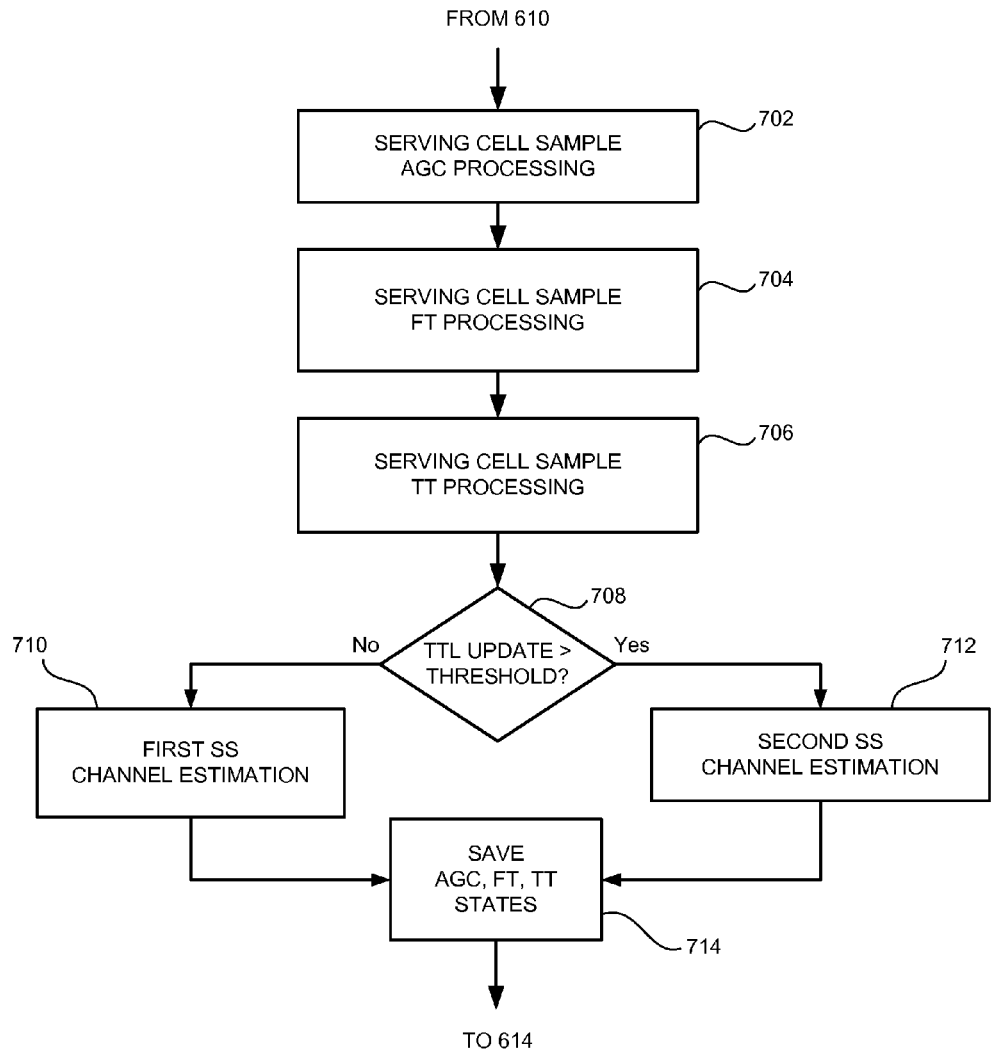
FIG. 7 is a flow chart depicting an example of serving cell processing.

FIG. 7 is a flow chart depicting the details of the serving cell processing of block 612. In block 702 AGC processing may be executed on the captured serving cell sample. As discussed with reference to FIG. 4, the AGC processing may include two processes, an LNA gain update and a DVGA gain update. For example, the correction module 308 may compute the LNA and DVGA gain updates based on the presently captured serving sample of the DRX cycle N, while applying the LNA gain update from the previous DRX cycle N−1 to the captured serving sample, and applying the DVGA gain update from the present DRX cycle N to the captured serving sample. The process may then proceed to block 704.

In block 704, frequency tracking may be applied to the updated serving sample. The frequency tracking may be computed based on the presently updated serving sample of the DRX cycle N, and applied to the updated serving sample of the same DRX cycle N. The process may then proceed to block 706.

In block 706, time tracking may be applied to the updated serving sample. The time tracking may be computed based on the presently updated serving sample of the DRX cycle N. The process may then proceed to block 708.

In block 708 a determination is made as to whether the time tracking update computed in block 706 is greater than a predetermined threshold. If the time tracking update is less than or equal to the predetermined threshold then the process proceeds to block 710. If the time tracking update is greater than the predetermined threshold then it indicates a significant timing slew, and the process proceeds to block 712.

In block 710, the DRX processor 210 performs a first channel/noise estimation. Specifically, the DRX processor 210 may apply the time tracking update computed from a previous serving sample in DRX cycle N−1 to the present serving sample, and store the time tracking update computed from the present serving sample for application to the next serving sample during DRX cycle N+1. Furthermore, the DRX processor may recompute the CIR and perform wide band (WB) channel frequency domain (FD) interpolation in order to obtain a channel estimate spanning all tones in the WB channel. The DRX processor 210 may also use channel estimation for Reed Solomon (RS) tones from inner loop time tracking loop output; compute a Rayleigh Backscattering (RB) based noise estimate; and compute the RSRP. The process may then proceed to block 714.

In block 712, The DRX processor 210 also performs a second channel/noise estimation. Specifically, the DRX processor 210 may apply the time tracking update from the DRX cycle N; perform channel estimation for RS tones; perform FD interpolation to obtain the WB channel estimate; compute RB based noise estimate; and compute the RSRP. The process may then proceed to block 714.

In block 714, the DRX processor may save the states (e.g., correction factors) of the AGC, frequency tracking, and time tracking processes, and proceed to block 614.

In block 614 the PDCCH paging signal of the serving sample is demodulated and the process proceeds to block 616. In block 616, a determination is made as to whether the paging signal is intended for the mobile device 202. If the PDCCH paging signal is intended for the mobile device 202, then the process proceeds to block 618. Otherwise, the process proceeds to block 628.

In block 618 the PDSCH paging signal of the serving sample is demodulated and the process proceeds to block 620. In block 620, a determination is made as to whether the PDSCH paging signal carries a paging payload for the mobile device 202. If the PDSCH does include a payload for the mobile device 202, and the PDSCH payload matches the RNTI of the mobile device 202, then the process proceeds to block 622. Otherwise, the process proceeds to block 628. In block 622, the process triggers the mobile device 202 to go online. For example, the demodulated PDSCH paging payload may indicate an incoming call. Accordingly, the DRX processor 210 may wake up the RF transceiver 208 and all other digital logic blocks in order to receive the incoming call. After block 622, the process ends.

In block 624, the process may initialize the DRX processor 210 to perform neighbor cell processing on the neighbor cell sample stored in the neighbor cell buffer 306. Specifically, the neighbor cell processing may include AGC processing, frequency tracking, time tracking, channel estimation, and RSRP measurements.

Figure 8:
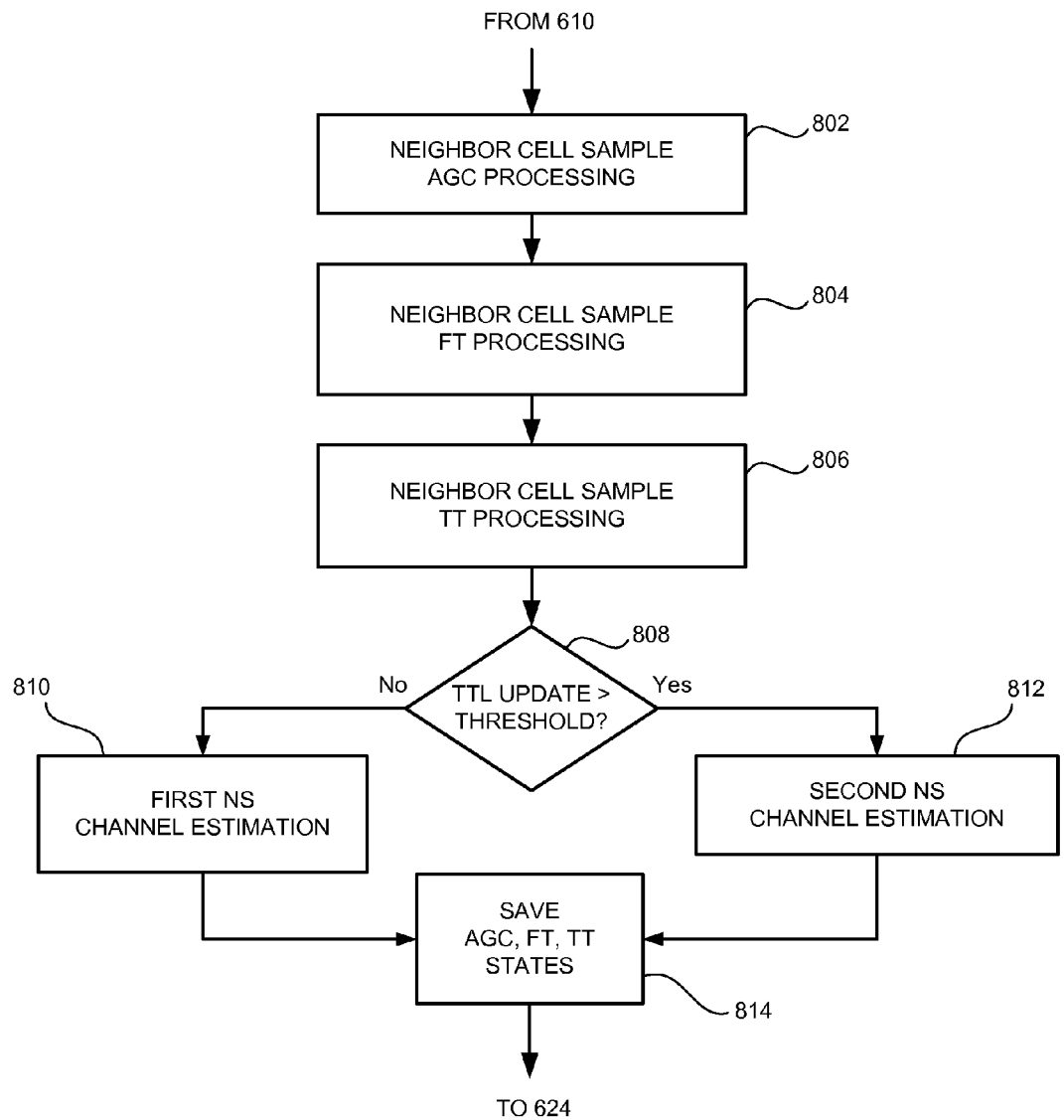
FIG. 8 is a flow chart depicting an example of neighbor cell processing.

FIG. 8 is a flow chart depicting the details of the neighbor cell processing of block 624. In block 802 AGC processing may be executed on the captured neighbor cell sample. As discussed with reference to FIG. 5, the AGC processing may include two processes, an LNA gain update and a DVGA gain update. For example, the correction module 308 may update the captured neighbor sample using the LNA and DVGA gain updates computed during the serving cell processing. The process may then proceed to block 804.

In block 804, frequency tracking may be applied to the updated neighbor sample. The frequency tracking may be computed based on the presently updated neighbor sample of the DRX cycle N, and applied to the updated neighbor sample of the same DRX cycle N. The process may then proceed to block 806.

In block 806, time tracking may be applied to the updated neighbor sample. The time tracking may be computed based on the presently updated neighbor sample of the DRX cycle N. The process may then proceed to block 808.

In block 808 a determination is made as to whether the time tracking update computed in block 806 is greater than a predetermined threshold. If the time tracking update is less than or equal to the predetermined threshold then the process proceeds to block 810. If the time tracking update is greater than the predetermined threshold then it indicates a significant timing slew, and the process proceeds to block 812.

In block 810, the DRX processor 210 performs a first channel/noise estimation. Specifically, the DRX processor 210 may apply the time tracking update computed from a previous neighbor sample in DRX cycle N−1 to the present neighbor sample, and store the time tracking update computed from the present neighbor sample for application to the next neighbor sample during DRX cycle N+1. Furthermore, the DRX processor 210 may use channel estimation for RS tones from inner loop time tracking loop output; and compute the RSRP. The process may then proceed to block 814.

In block 812, the DRX processor 210 performs a second channel/noise estimation. Specifically, the DRX processor 210 may apply the time tracking update from the DRX cycle N; perform channel estimation for RS tones; and compute the RSRP. The process may then proceed to block 814.

In block 814, the DRX processor may save the states (e.g., correction factors) of the frequency tracking and time tracking processes, and proceed to block 626.

In block 626, the process conducts cell evaluation of the serving cells and the neighbor cells to determine the signal strength of the serving cell compared to the neighbor cells and whether the mobile device 202 should prepare for handover from the serving cell to one of the neighbor cells. This evaluation process may include RSRP filtering of the serving and neighbor cell measurements; performance of a serving cell suitability check; reselection ranking of serving and measured neighbor cells if serving cell RSRP measurement meets certain predetermined thresholds; and evaluating the need for transition to online mode in the current DRX cycle or the next DRX cycle. Evaluating the need for transition to online mode in the current DRX cycle may include comparing the serving cell RSRP threshold and deciding whether panic mode cell detection may need to be triggered, as well as evaluating the need of neighbor cell PBCH based on certain relative and absolute RSRP thresholds. Evaluating the need to transition to online mode in the next DRX cycle may include updating periodic timers for cell detection, Inter-Frequency (Inter-F), and/or Inter-Radio Access Technologies (Inter-RAT) measurements and comparing them with the time thresholds. If the thresholds are reached, the mobile device 202 is triggered to wake up in online mode during the next DRX cycle. The process then proceeds to block 628.

In block 628, based on the various cell evaluation methods implemented in block 626, a determination is made as to whether the mobile device 202 is needed to be brought online. If the need to go online is not present, then the process proceeds to block 640. Otherwise, the process proceeds to block 630.

In block 630, the process initializes the necessary components of the mobile device 202 to wake up and transitions the mobile device 202 into online mode. The process then proceeds to block 632 where the process performs online processing. Online processing allows the mobile device 202 to transition from the offline mode to online mode in the same DRX cycle. This transition may be initiated by certain events, such as panic mode trigger for cell detection, neighbor PBCH demodulation trigger, and an Inter-RAT and Inter-F measurement trigger. These triggers may be determined as part of the previous stage of cell evaluation in block 626.

The panic mode trigger is activated when the mobile device 202 determines that the serving cell RSRP has decreased below a certain threshold and there are no strong neighbors as part of the monitored set. The mobile device 202 may then reconfigure the serving and neighbor cell buffers 304 and 306 for online mode of operation and then turn on the RF transceiver 208 followed by a new neighbor cell detection attempt.

The neighbor PBCH demodulation trigger is activated when a neighbor cell satisfies a predetermined absolute RSRP threshold and relative RSRP threshold. The RF transceiver 208 may then be turned on up to 1 ms before the 10 ms paging frame boundary for the desired neighbor cell to allow for AGC settling time. This may be followed by a TD sample capture at 1.92 MHz to be processed offline. The RF transceiver may then be turned off and NBCH processing initialized.

Inter-RAT and Inter-Frequency Measurement trigger is activated when the mobile device 202 determines that the serving cell RSRP has decreased below a certain threshold or that a certain Inter-RAT/Inter-F measurement timer for high priority cells has expired and that it needs to perform Inter-RAT or Inter-F measurements. For Inter-RAT, and when operating under other communication systems, such as Data Optimized (DO), UMTS, and GSM, the mobile device 202 may need to switch the RF transceiver 208 back on, tune the RF transceiver 208 to the desired RAT/Frequency, and then perform the relevant measurements. For Inter-Frequency the mobile device 202 may need to reconfigure the serving and neighbor cell buffers 304 and 306 for online mode of operation, switch the RF transceiver 208 back on, tune the RF transceiver 208 to the desired frequency, and then performing the relevant measurements.

Figure 9:
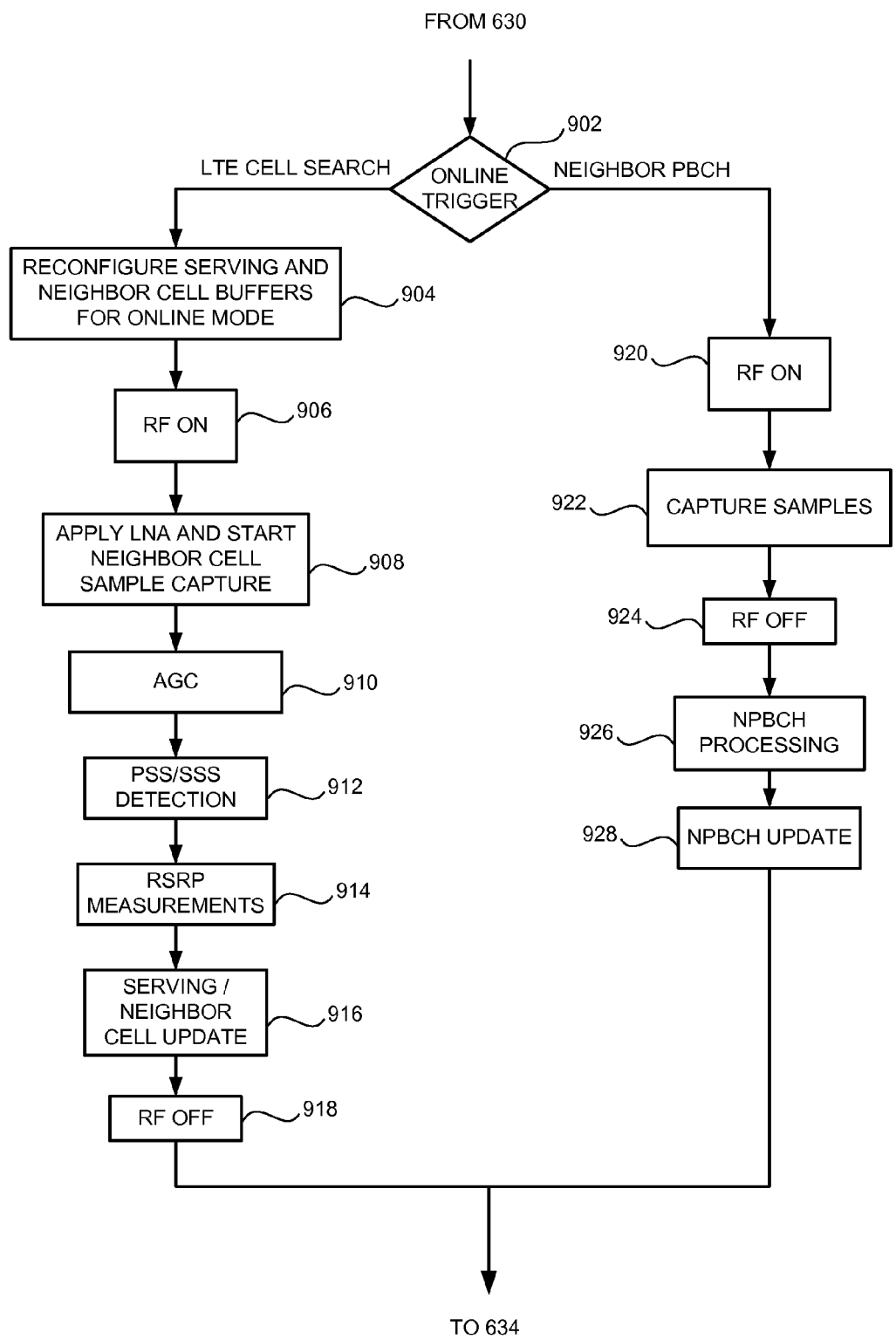
FIG. 9 is a flow chart depicting examples of various scenarios in which online processing may be triggered.
Figure 10:
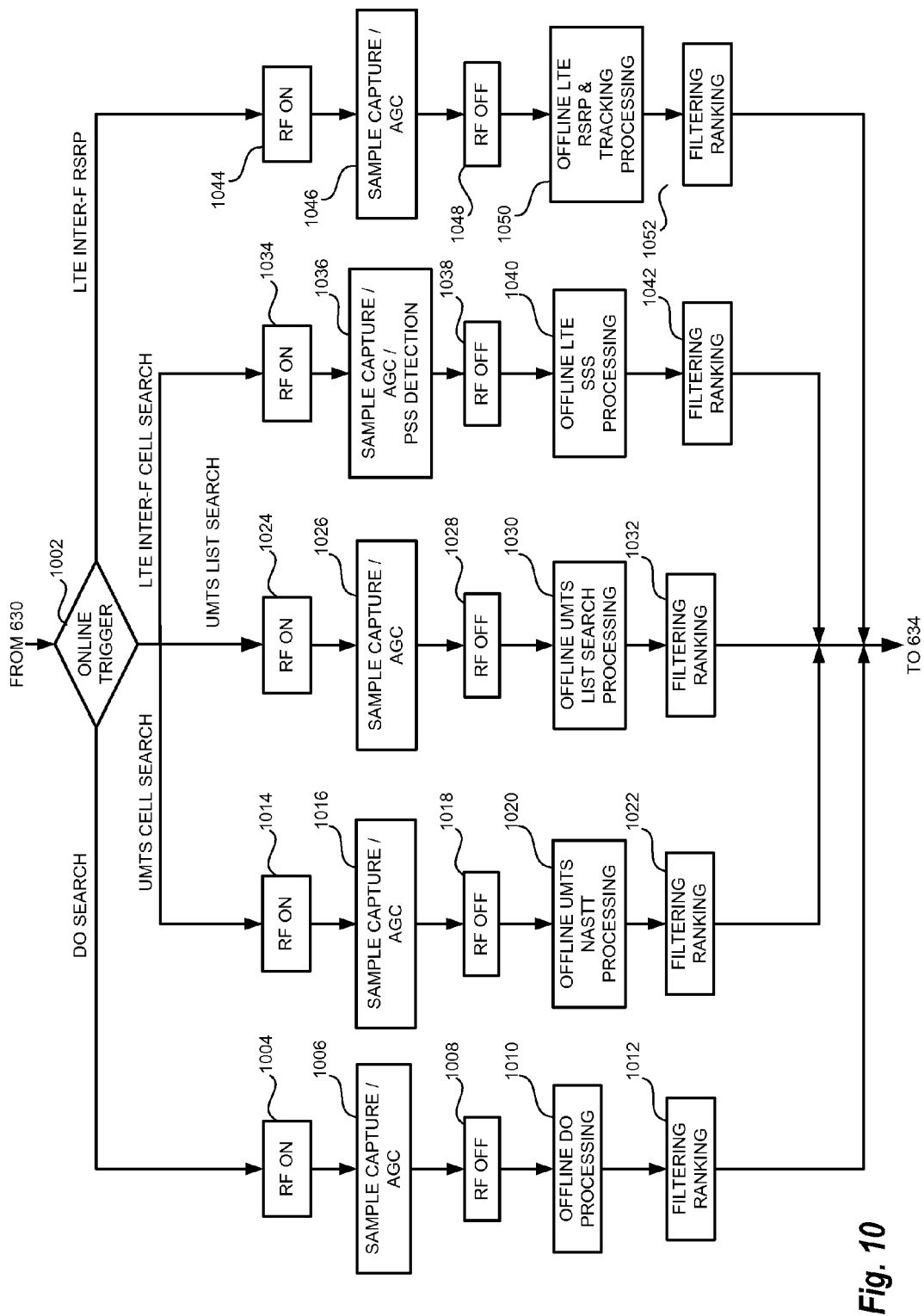
FIG. 10 is a flow chart depicting examples of various scenarios in which online processing may be triggered.

FIGS. 9-10 show the various scenarios in which online processing may be triggered as well as some of the steps that may be involved in the online processing block 632. As shown in FIG. 9, in block 902, the online mode may be triggered by an LTE cell search or by neighbor cell PBCH. These searches may be initiated by a weak pilot signal from either or both of the serving cell base station 204 and the neighbor cell base station 206. Depending on whether the online process is triggered by the LTE cell search or the neighbor cell PBCH, the process proceeds to either block 904 or block 920.

In block 904, the process reconfigures the serving and neighbor cell buffers for online mode operation, and the process proceeds to block 906. In block 906, the process may power up the RF transceiver 208, and then proceed to block 908. In block 908, the process may apply the most recent LNA gain update and begin neighbor cell sample capture, and proceed to block 910. In block 910, the process may perform AGC processing on the captured neighbor cell sample, and proceed to block 912. In block 912, the process may perform primary synchronization signal (PSS) detection and/or secondary synchronization signal (SSS) detection. The process may then proceed to block 914 where it may perform RSRP measurements and proceed to block 916. In block 916, the process may update the serving and neighbor cells, turn off the RF transceiver 208 in block 916, and then proceed to block 634.

In block 920, the process may turn on the RF transceiver 208, and proceed to block 922. In block 922, the process may capture serving cell samples and neighbor cell samples, and proceed to block 924. In block 924, the process may turn off the RF transceiver 208, and proceed to block 926. In block 926, the process may perform neighbor PBCH processing, which includes AGC processing, frequency tracking, time tracking, channel/noise estimation, and neighbor PBCH demodulation and decoding, and proceed to block 928. In block 928, the process updates the neighbor PBCH based on the processing in block 928, and proceed to block 634.

As shown in FIG. 10, the online mode may be triggered by a DO search, UMTS cell search, UMTS list search, LTE Inter-F cell search, and LTE Inter-F RSRP. These searches may be initiated by a weak pilot signal from either or both of the serving cell base station 204 and the neighbor cell base station 206. Each separate trigger initiates a sequence of events that differ in one or more ways from one another. For example, the process turns off the RF transceiver 208 after each one of the triggers, as shown in blocks 1004, 1014, 1024, 1034, and 1044. The DO search trigger initiates sample capture and AGC processing of the captured samples in block 1004. The UMTS cell search, UMTS List search, LTE Inter-F, and LTE Inter-F RSRP similarly initiate sample capture and AGC processing in blocks 1006, 1016, 1026, and 1046, respectively. Block 1036 of the LTE Inter-F cell search trigger, however, further includes PSS detection. After the sample capture processing blocks, the process of each trigger shuts down the RF transceiver 208 and proceeds to perform trigger-specific processing. As shown, in block 1010, the DO search initiates a offline DO processing; in block 1020, the UMTS cell search initiates offline UMTS New Additional Step Two cum Three (NASTT) processing; in block 1030, the UMTS list search trigger initiates offline LTE SSS processing; and in block 1050, the LTE Inter-F RSRP trigger initiates offline LTE RSRP and tracking processing. After the trigger-specific processing, each process proceeds to perform filter ranking, as indicated in blocks 1012, 1022, 1032, 1042, and 1052. After the filter ranking, each of the trigger-specific processes proceed to block 634.

In block 634, a determination is made as to whether any other Inter-RAT or Inter-F processing remains to be performed. If not, the process proceeds to block 640. Otherwise the process proceeds to block 634. In block 634, the process shuts down the RF transceiver 208 in case one of the triggers in the online processing block 632 has failed to shut down the RF transceiver 208. The process then proceeds to block 638 where the Inter-RAT or Inter-F processing is performed offline. Then the process proceeds to block 640. In block 640, once the mobile device 202 is done with its processing, the process shuts down the various key components, such as the DRX processor 210, the digital processing blocks, and the crystal oscillator clock. The sleep controller, however, remains active, and maintains count until the next DRX cycle. The process then proceeds to block 642 where the mobile device 202 enters sleep mode, and the process ends.

Figure 11:
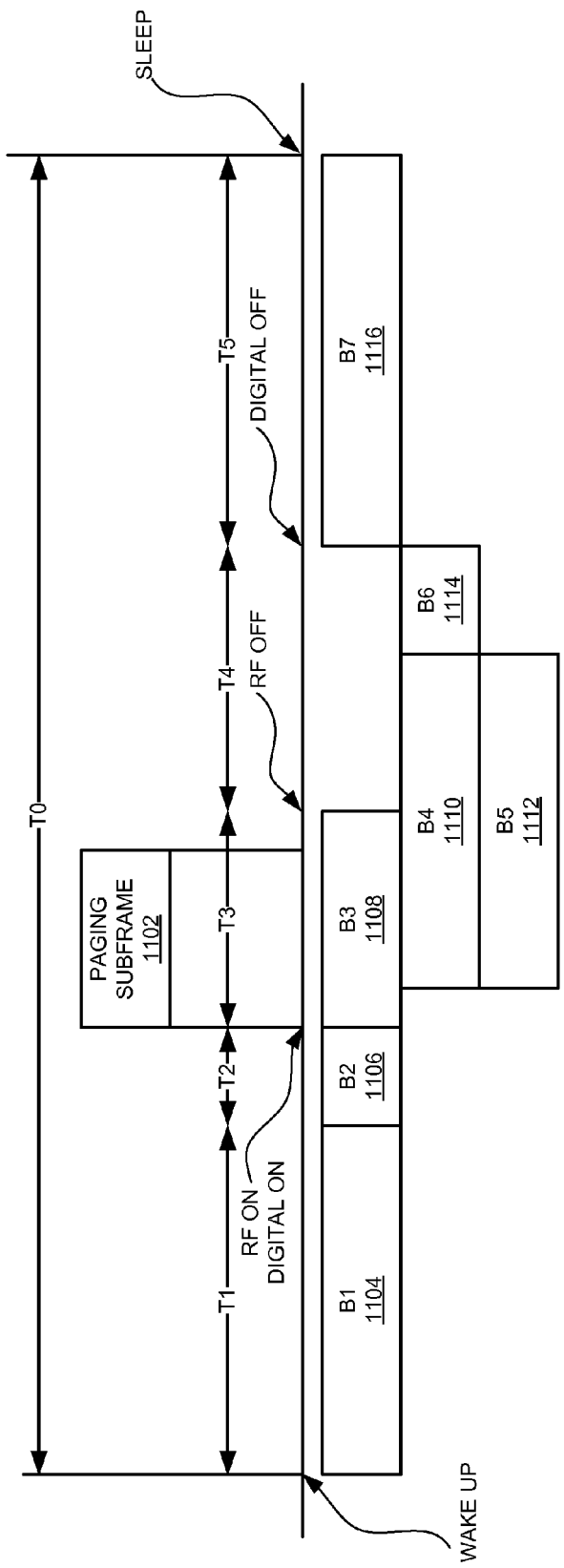
FIG. 11 is a time line of example processing events executed during an offline DRX process.

FIG. 11 is a time line of processing events executed during an offline DRX process where the paging subframe is not intended for the mobile device receiving the subframe. This time line corresponds to a particular path through the flow chart of FIG. 6. In this offline DRX process, a paging subframe 1102 is being monitored across PDCCH. As shown in FIG. 11, a mobile device, such as the mobile device 202 of FIG. 2, may wake up at a point in time prior to receiving the paging subframe 1102 in order to wake up and warm up the components necessary for receiving and processing the paging subframe 1102. In block B1 1104, the mobile device may initialize the crystal oscillator clock and the necessary digital processing components. This process may last approximately 3.5 ms, for example. In block B2 1106, an RF transceiver, such as the RF transceiver 208, may be woken up and programmed and calibrated to receive the paging subframe 1102. The process of block B2 1106 may last approximately 0.5 ms, for example. After the RF transceiver and the necessary digital logic blocks are awake and stabilized, a DRX processor, such as the DRX processor 210 of FIGS. 2 and 3, may initialize sample capture of the paging subframe 1102 and application of LNA in block B3 1108. Because the paging subframe 1102 is typically 1 ms, the sample capture of block B2 1108 may be set to be slightly longer in order to capture samples of a subsequent subframe. The process in block B3 1108 may last approximately 1.2 ms, for example. After sample capture of block B3 1108 is complete, the RF transceiver is turned off.

While performing sample capture in block B3 1108, the DRX processor may initialize the processing to determine whether the paging subframe is intended for the mobile device 202. Accordingly, in block B4 1110, the DRX processor may perform AGC processing, frequency tracking, time tracking, channel estimation, RSRP/RSRQ measurement, and PDCCH demodulation of the serving cell; and in block B5 1112, the DRX processor, may perform similar processing for the neighbor cell. In this scenario, because the paging subframe is not intended for the mobile device 202, the process proceeds to block B6 1114, where the DRX processor may perform cell evaluation to determine whether to perform handoff, as discussed with reference to block 626 of FIG. 6. The process from the end of block B3 1108 to the beginning of block B7 1116 (e.g., T4) may last approximately 2.3 ms. After cell evaluation of block B6 1114, all digital components used for offline DRX processing are turned off, and the mobile device 202 begins the cool down process and shuts off all non-essential clocks in block B7 1116. The cool down process of block B7 1116 may last approximately 3.5 ms, for example. Thereafter, the mobile device 202 enters sleep mode.

Figure 12:
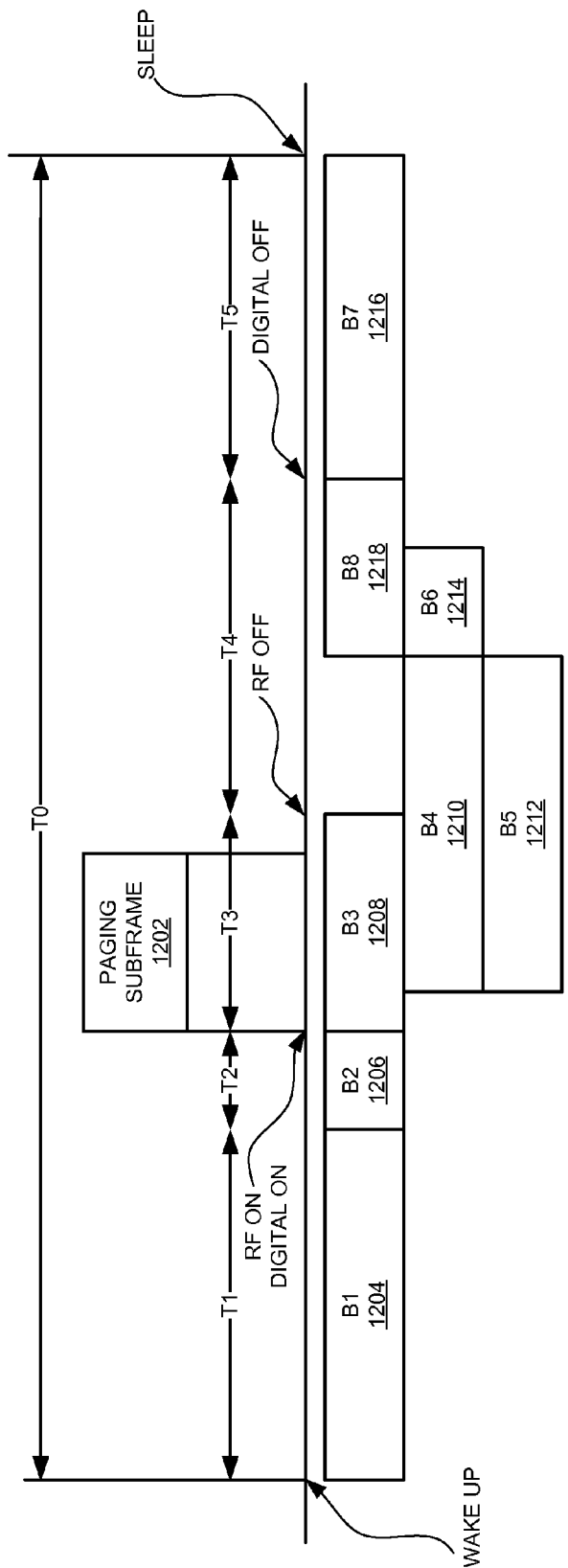
FIG. 12 is another time line of example processing events executed during an offline DRX process.

FIG. 12 is a time line of processing events executed during an offline DRX process where the paging payload of the paging subframe is not intended for the mobile device receiving the subframe. This time line corresponds to a particular path through the flow chart of FIG. 6. In FIG. 12, blocks B1 1204 through B7 1216 correspond to the blocks B1 1104 through B7 1116 of FIG. 11. One difference between FIGS. 11 and 12 is that in FIG. 12, the DRX processor initializes PDSCH processing in order to determine whether the paging payload is intended for the mobile device 202. This process is performed in block B8 1218. Because of the additional processing time used to make this determination, time T4 of FIG. 12 may be slightly longer than that of FIG. 11. For example, it may take approximately 2.8 ms. As such, the digital processing blocks are turned off after block B8 1218.

Figure 13:
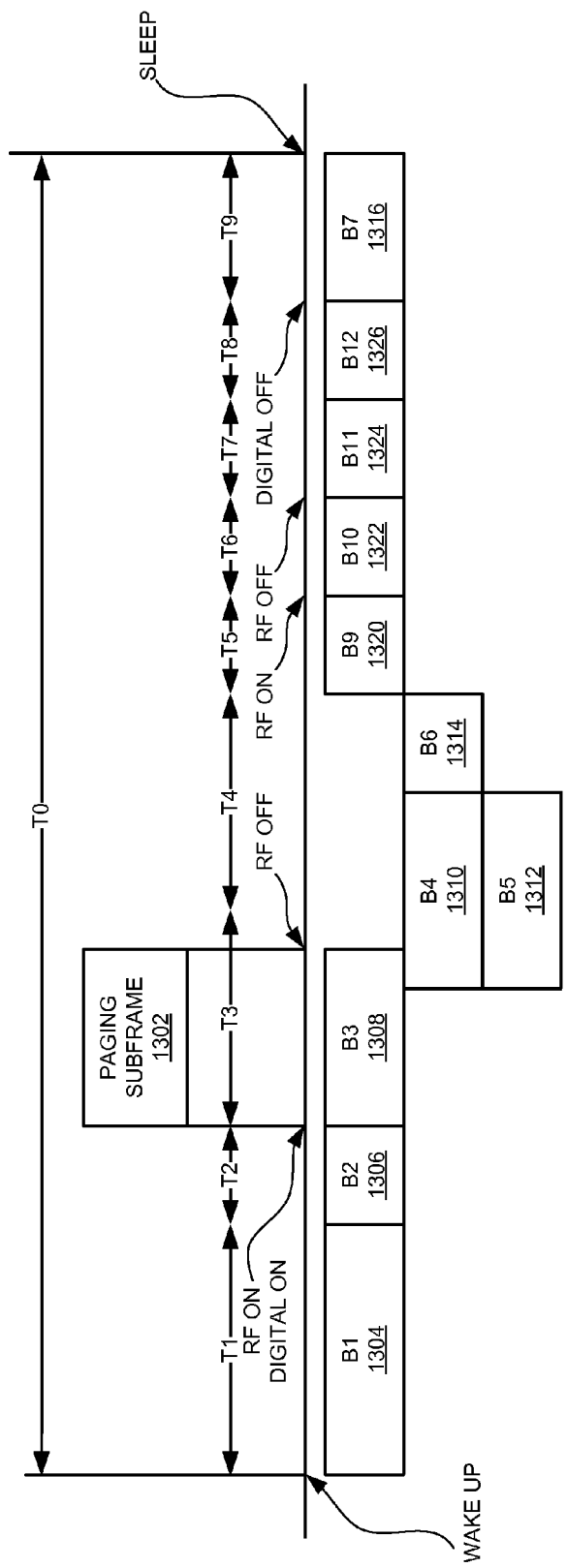
FIG. 13 is yet another time line of example processing events executed during an offline DRX process.

FIG. 13 is a time line of processing events executed during an offline DRX process where the paging subframe is not intended for the mobile device receiving the subframe, but where the DRX processor determines to measure an additional system, such as DO, UMTS, GSM, Inter-F, and LTE under a different frequency in case the signal from the serving cell is below a predetermined threshold. This time line corresponds to a particular path through the flow chart of FIG. 6. In FIG. 13, blocks B1 1304 through B7 1316 correspond to the blocks B1 1104 through B7 1116 of FIG. 11. After block B6 1314, where the cell evaluation process is performed, the DRX processor initializes the RF transceiver in block B9 1320. The process of block B9 1320 may take approximately 0.5 ms, for example. Once the RF transceiver is up, the DRX processor initializes the processing for the particular system in block B10 1322, such as sample capture, AGC processing, etc. Depending on the type of system the processing is being performed for, the processing time T6 may range from 4 ms to 33 ms, for example. After the processing of block B10 1322 is complete, the RF transceiver is turned off, and the DRX processor initializes further processing while offline (e.g., NASTT processing for a UMTS system) in block B11 1324. Thereafter, the DRX processor may perform other post-processing in block B12 1326, and then shut down the digital logic blocks after time T8, which may be approximately 1 ms, for example.

Figure 14:
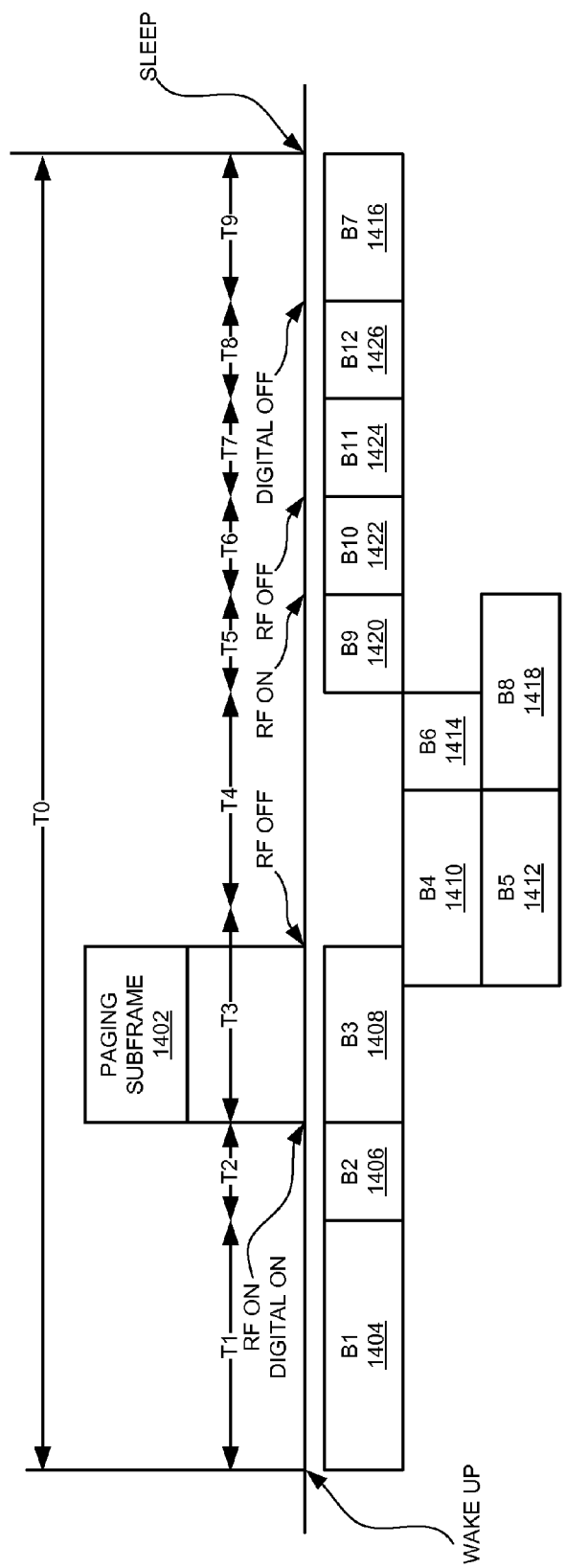
FIG. 14 is yet another time line of example processing events executed during an offline DRX process.

FIG. 14 is a time line of processing events executed during an offline DRX process where the paging payload of the paging subframe is not intended for the mobile device receiving the subframe. This time line corresponds to a particular path through the flow chart of FIG. 6. In FIG. 14, blocks B1 1404 through B7 1416 and blocks B9 1420 through B12 1426 correspond to the blocks B1 1304 through B7 1316 and blocks B9 1320 through B12 1326 of FIG. 13. One difference between FIGS. 13 and 14 is that in FIG. 14 the DRX processor initializes PDSCH processing in order to determine whether the paging payload is intended for the mobile device 202. This process is performed in block B8 1418.

Figure 15:
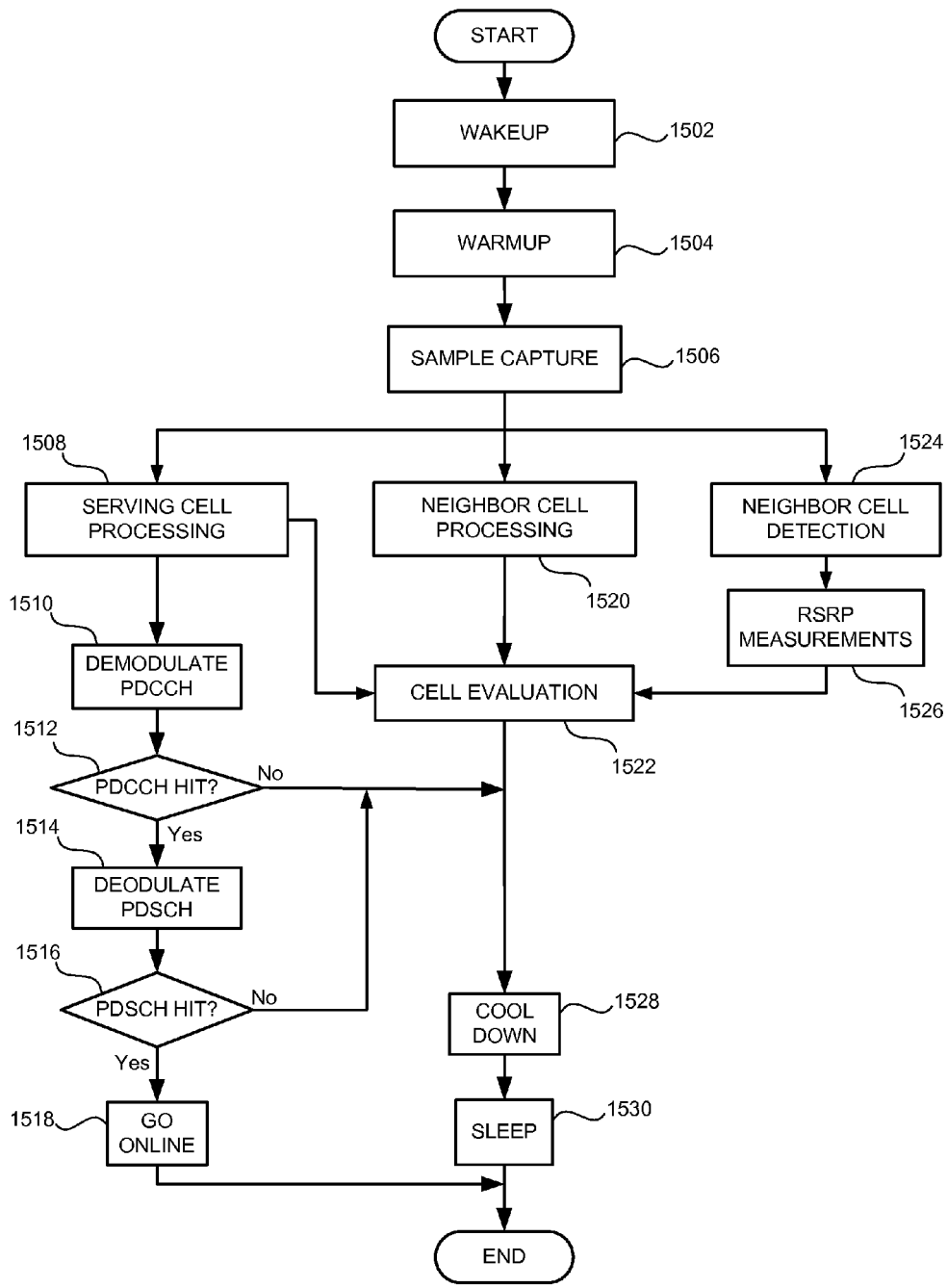
FIG. 15 is a flow chart depicting an example of an online stage in an online DRX process.

FIG. 15 is a flow chart depicting an example of an online DRX process 1500 that may be executed by the mobile device 202. Online DRX processing may be triggered by certain predetermined scenarios for the DRX cycle N. The decision to use online mode may be made in the previous DRX cycle N−1. The various scenarios that would trigger online DRX processing are periodic asynchronous (ASYNC) neighbor cell identification, and periodic synchronous (SYNC) neighbor identification for FDD and TDD.

As shown in FIG. 15, in block 1502, a sleep controller, similar to that discussed with reference to FIG. 6, wakes up and initializes the necessary clock for running the digital processing blocks, the RF transceiver 208, DRX processor 210, as well all of the other components necessary for performing DRX processing, such as the serving and neighbor cell buffers 304 and 306. Other hardware components that are not used for performing DRX processing may remain in a sleep state. The process continues to block 1504. In block 1504, the RF transceiver 208 locks onto the carrier frequency of the anticipated paging signals, and the process proceeds to block 1506.

In block 1506, the DRX processor 210 may reconfigure the memory (e.g., serving cell buffer 304 and neighbor cell buffer 306) for storing serving cell and neighbor cell samples, and proceed to capture the serving cell and neighbor cell samples via the RF transceiver 208, and store the captured samples in the respective buffers 304 and 306. The process then proceeds to blocks 1508, 1520, and 1524.

In block 1508, the process may initialize the DRX processor 210 to perform serving cell processing on the serving cell sample stored in the serving cell buffer 304. This is similar to what is performed in block 612 of the offline DRX process shown in FIG. 6. The difference between the online DRX process and the offline DRX process is that in the online DRX process of FIG. 15, the AGC, frequency tracking, and time tracking updates are computed and applied in parallel as the free flowing samples are received by the serving cell buffer, unlike the sequential processing performed in offline DRX mode. After performing serving cell processing, the process proceeds to blocks 1510 and 1522.

In block 1510 the PDCCH paging signal of the serving sample is demodulated and the process proceeds to block 1512. In block 1512, a determination is made as to whether the paging signal is intended for the mobile device 202. If the PDCCH paging signal is intended for the mobile device 202, then the process proceeds to block 1514. Otherwise, the process proceeds to block 1528.

In block 1514 the PDSCH paging signal of the serving sample is demodulated and the process proceeds to block 1516. In block 1516, a determination is made as to whether the PDSCH paging signal carries a paging payload for the mobile device 202. If the PDSCH does include a payload for the mobile device 202, and the PDSCH payload matches the RNTI of the mobile device 202, then the process proceeds to block 1518. Otherwise, the process proceeds to block 1528. In block 1518, the process triggers the mobile device 202 to go online. After block 1518, the process ends.

In block 1520, the process may initialize the DRX processor 210 to perform neighbor cell processing on the neighbor cell sample stored in the neighbor cell buffer 306. This is similar to what is performed in block 624 of the offline DRX process shown in FIG. 6. The difference between the online DRX process and the offline DRX process is that in the online DRX process of FIG. 15, the AGC, frequency tracking, and time tracking updates are computed and applied in parallel as the free flowing samples are received by the neighbor cell buffer, unlike the sequential processing performed in offline DRX mode. After performing neighbor cell processing, the process proceeds to block 1522.

In block 1524, the process may initialize neighbor cell detection, such as ASYNC and SYNC detection. Both ASYNC and SYNC detection include PSS and SSS processing. After PSS processing is performed online, the RF transceiver may be turned off, so that SSS processing may be performed offline. After block 1524, the process proceeds to block 1526. In block 1526, RSRP measurements are performed, and the process proceeds to block 1522.

In block 1522, the process conducts cell evaluation of the serving cells and the neighbor cells to determine the signal strength of the serving cell compared to the neighbor cells and whether the mobile device 202 should prepare for handover from the serving cell to one of the neighbor cells. This cell evaluation process is similar to that of block 626 of FIG. 6. After block 1522, the process proceeds to block 1528.

In block 1528, the process shuts down the various key components, such as the DRX processor 210, the digital processing blocks, and the crystal oscillator clock. The sleep controller, however, remains active, and maintains count until the next DRX cycle. The process then proceeds to block 1530 where the mobile device 202 enters sleep mode, and the process ends.

Figure 16:
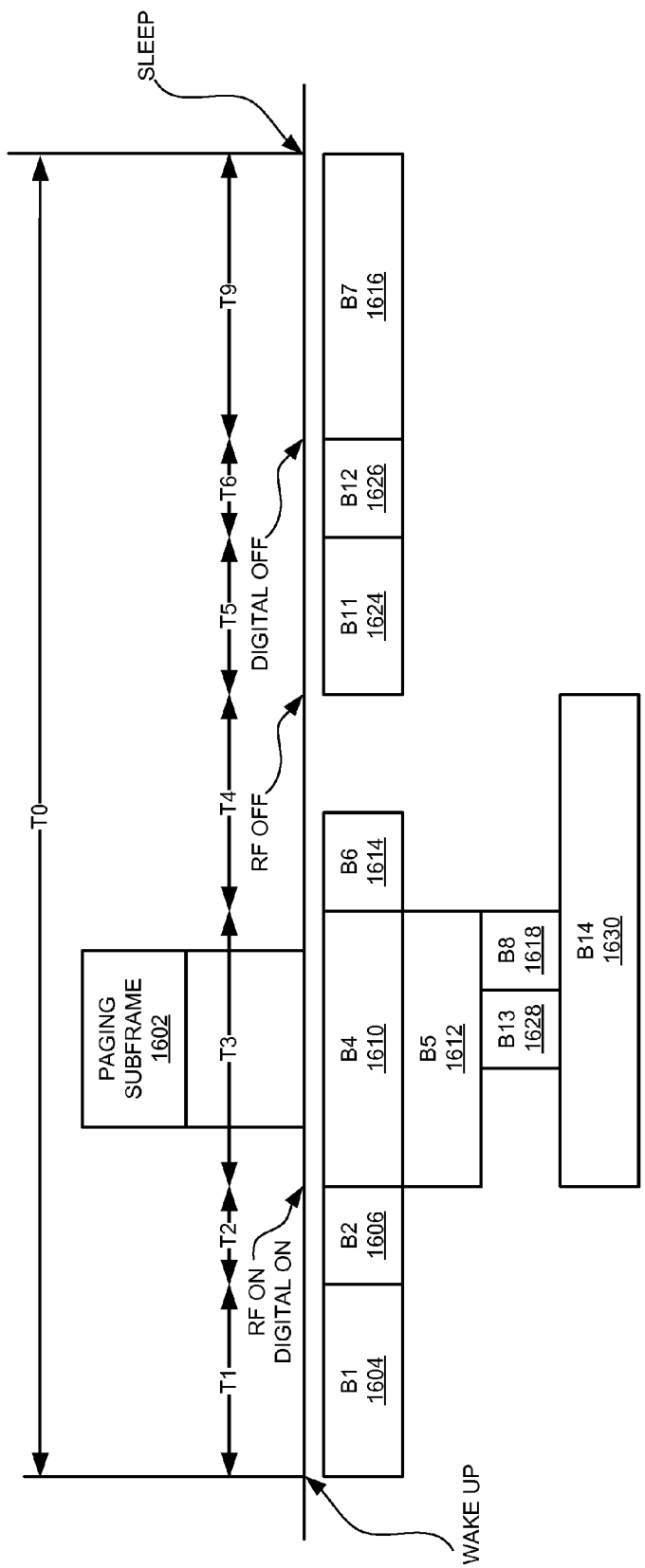
FIG. 16 is a time line of example processing events executed during an online DRX process.

FIG. 16 is a time line of processing events executed during an online DRX process where the paging payload of the paging subframe is not intended for the mobile device receiving the subframe. This time line corresponds to a particular path through the flow chart of FIG. 15. In this online DRX process, a paging subframe 1102 is being monitored across PDCCH. As shown in FIG. 16, a mobile device, such as the mobile device 202 of FIG. 2, may wake up at a point in time prior to receiving the paging subframe 1602 in order to wake up and warm up the components necessary for receiving and processing the paging subframe 1602. In block B1 1604, the mobile device may initialize the crystal oscillator clock and the necessary digital processing components. In block B2 1606, an RF transceiver, such as the RF transceiver 208, may be woken up and programmed and calibrated to receive the paging subframe 1602. After the RF transceiver and the necessary digital logic blocks are awake and stabilized, a DRX processor may initialize sample capture and the processing to determine whether the paging subframe is intended for the mobile device 202. Accordingly, in block B4 1610, the DRX processor may perform AGC processing, frequency tracking, time tracking, channel estimation, RSRP/RSRQ measurement, and PDCCH demodulation of the serving cell; and in block B5 1612, the DRX processor, may perform similar processing for the neighbor cell.

Furthermore, the DRX processor may initialize online PSS processing for the respective ASYNC or SYNC detection in block B14 1630. The duration of the online PSS processing may depend on whether it is performed for ASYNC FDD LTE cell detection, SYNC FDD LTE cell detection, or SYNC TDD LTE cell detection, and may vary from 18 ms to 21 ms, for example. For instance, the SYNC FDD LTE cell detection and SYNC TDD LTE cell detection may have a shorter duration than the ASYNC FDD LTE cell detection due to certain design specifications of the DRX processor being optimized for SYNC FDD LTE cell detection and SYNC TDD LTE cell detection. In block B13 1628, the DRX processor performs PDCCH processing; and in block B8 1618, the DRX processor performs PDSCH processing. In block B6 1614, the DRX processor may perform cell evaluation to determine whether to perform handoff, as discussed with reference to block 1522 of FIG. 15. After the online PSS processing block B14 1634, the RF transceiver is turned off. Thereafter, the DRX processor may continue the respective ASYNC or SYNC detection by initializing the offline SSS processing in block B11 1624. The DRX processor may then perform other post-processing in block B12 1626, and then shut down the digital logic components that are no longer used. Finally, the mobile device 202 begins the cool down process and shuts off all non-essential clocks in block B7 1616. Thereafter, the mobile device 202 enters sleep mode.

Figure 17:
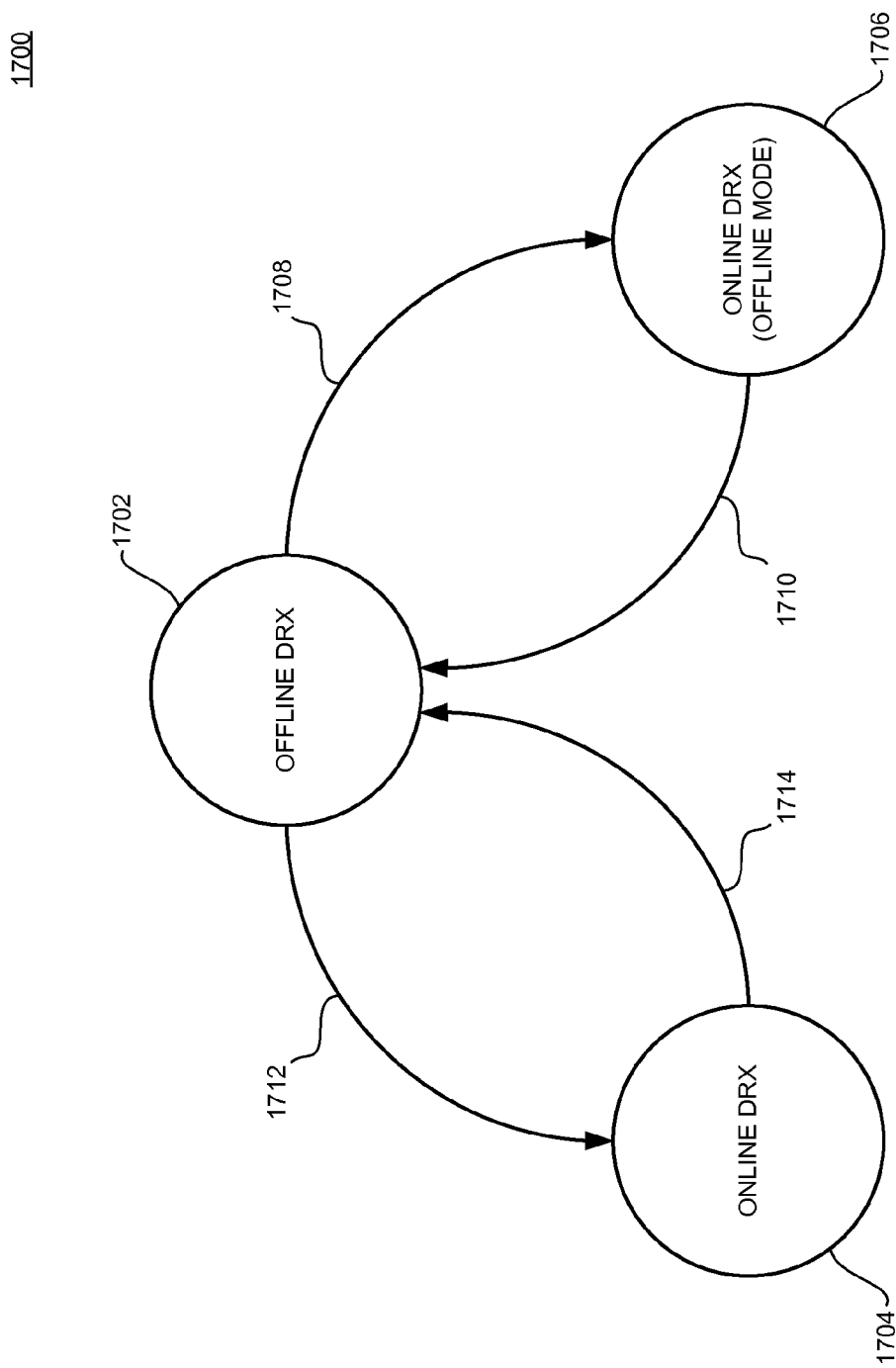
FIG. 17 is a state machine diagram exemplifying online and offline DRX process states.

FIG. 17 is a state machine diagram exemplifying online and offline DRX process states. As shown in FIG. 1, the DRX state machine diagram 1700 may include an offline DRX state 1702, an online DRX state 1704, and an online DRX state in offline mode 1706. The offline DRX state 1702 represents the state during which processing of captured serving cell and neighbor cell samples is conducted while the RF transceiver is off. Certain triggers 1708 may cause a transition to the online DRX state in offline mode 1704, which may constitute the turning on of the RF transceiver, among other things. The triggers 1708 may be determined during the processing of the captured samples, in particular, during cell evaluation 626. These triggers may be the panic mode trigger for cell detection, the neighbor PBCH demodulation trigger, and the Inter-RAT and Inter-F measurement trigger, as discussed with reference to FIG. 6. Completion of the panic search, the neighbor PBCH demodulation, the Inter-RAT measurements, or the Inter-F measurements may trigger a transition 1710 back to the offline DRX state 1702 by turning off the RF transceiver.

The transition 1712 from the offline DRX state 1702 to online DRX state 1706 may be triggered by a scheduled period neighbor search. The online DRX state 1706 is also characterized by an active RF transceiver. The difference between the online DRX state 1706 and the online DRX state in offline mode 1704 is that, in the online DRX state 1706, various sample processing steps, such as AGC processing, frequency tracking, and time tracking are performed in parallel with the RF transceiver on, instead of sequentially with the RF transceiver off, as in the online DRX state in offline mode 1704. The transition 1714 from the online DRX state 1706 to the offline DRX state 1702 may occur when no Intra-F search is scheduled.

In this manner, a mobile device that implements the process described in the DRX state machine 1700 may adapt to various communication scenarios by transitioning between online and offline DRX states in response to specific triggers initiated by different scenarios. Such DRX adaptability facilitates a significant reduction in power consumption in different operating modes.

Figure 18:
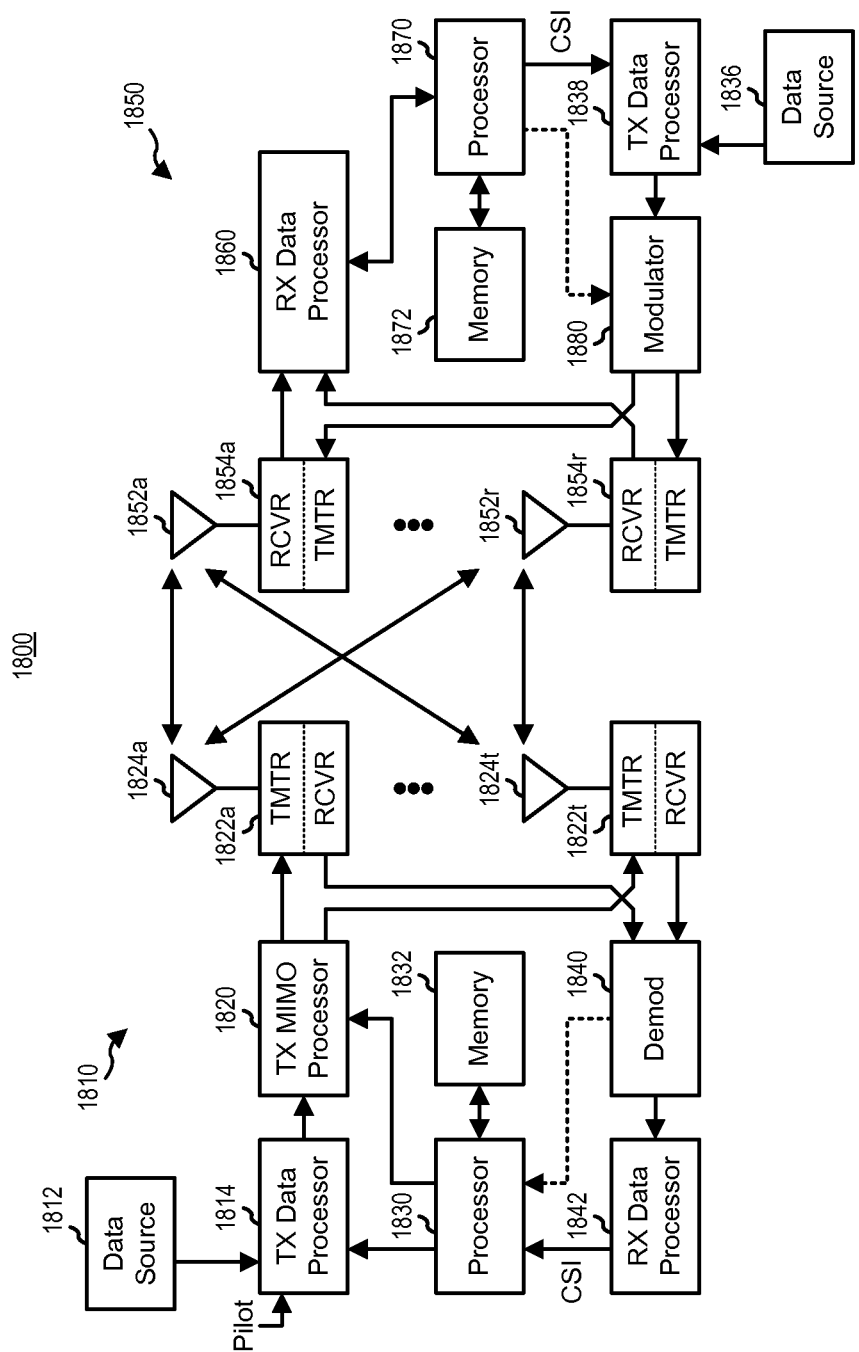
FIG. 18 is a block diagram of an example communication system for implementing various offline DRX processing mechanisms described herein.

FIG. 18 a block diagram of a MIMO communication system 1800 for implementing various offline and online DRX processing mechanisms, as described with reference to FIGS. 1-17. As shown in FIG. 18, the communication system 1800 may include a transmitter system 1810 (also known as the access point) and a receiver system 1850 (also known as access terminal). At the transmitter system 1810, traffic data for a number of data streams is provided from a data source 1812 to a transmit (TX) data processor 1814.

In an embodiment, each data stream is transmitted over a respective transmit antenna. TX data processor 1814 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1830.

The modulation symbols for all data streams are then provided to a TX MIMO processor 1820, which may further process the modulation symbols (e.g., for OFDM). TX MIMO processor 1820 then provides NT modulation symbol streams to NT transmitters (TMTR) 1822a through 1822t. In certain embodiments, TX MIMO processor 1820 applies beamforming weights to the symbols of the data streams and to the antenna from which the symbol is being transmitted.

Each transmitter 1822 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 1822a through 1822t are then transmitted from NT antennas 1824a through 1824t, respectively.

At receiver system 1850, the transmitted modulated signals are received by NR antennas 1852a through 1852r and the received signal from each antenna 1852 is provided to a respective receiver (RCVR) 1854a through 1854r. Each receiver 1854 conditions (e.g., filters, amplifies, and downconverts) a respective received signal, digitizes the conditioned signal to provide samples, and further processes the samples to provide a corresponding "received" symbol stream.

An RX data processor 1860 then receives and processes the NR received symbol streams from NR receivers 1854 based on a particular receiver processing technique to provide NT "detected" symbol streams. The RX data processor 1860 then demodulates, deinterleaves, and decodes each detected symbol stream to recover the traffic data for the data stream. The processing by RX data processor 1860 is complementary to that performed by TX MIMO processor 1820 and TX data processor 1814 at transmitter system 1810.

A processor 1870 periodically determines which precoding matrix to use (discussed below). Processor 1870 formulates a reverse link message including a matrix index portion and a rank value portion.

The reverse link message may comprise various types of information regarding the communication link and/or the received data stream. The reverse link message is then processed by a TX data processor 1838, which also receives traffic data for a number of data streams from a data source 1836, modulated by a modulator 1880, conditioned by transmitters 1854a through 1854r, and transmitted back to transmitter system 1810.

At transmitter system 1810, the modulated signals from receiver system 1850 are received by antennas 1824, conditioned by receivers 1822, demodulated by a demodulator 1840, and processed by a RX data processor 1842 to extract the reserve link message transmitted by the receiver system 1850. Processor 1830 then determines which pre-coding matrix to use for determining the beamforming weights then processes the extracted message.

Figure 19:
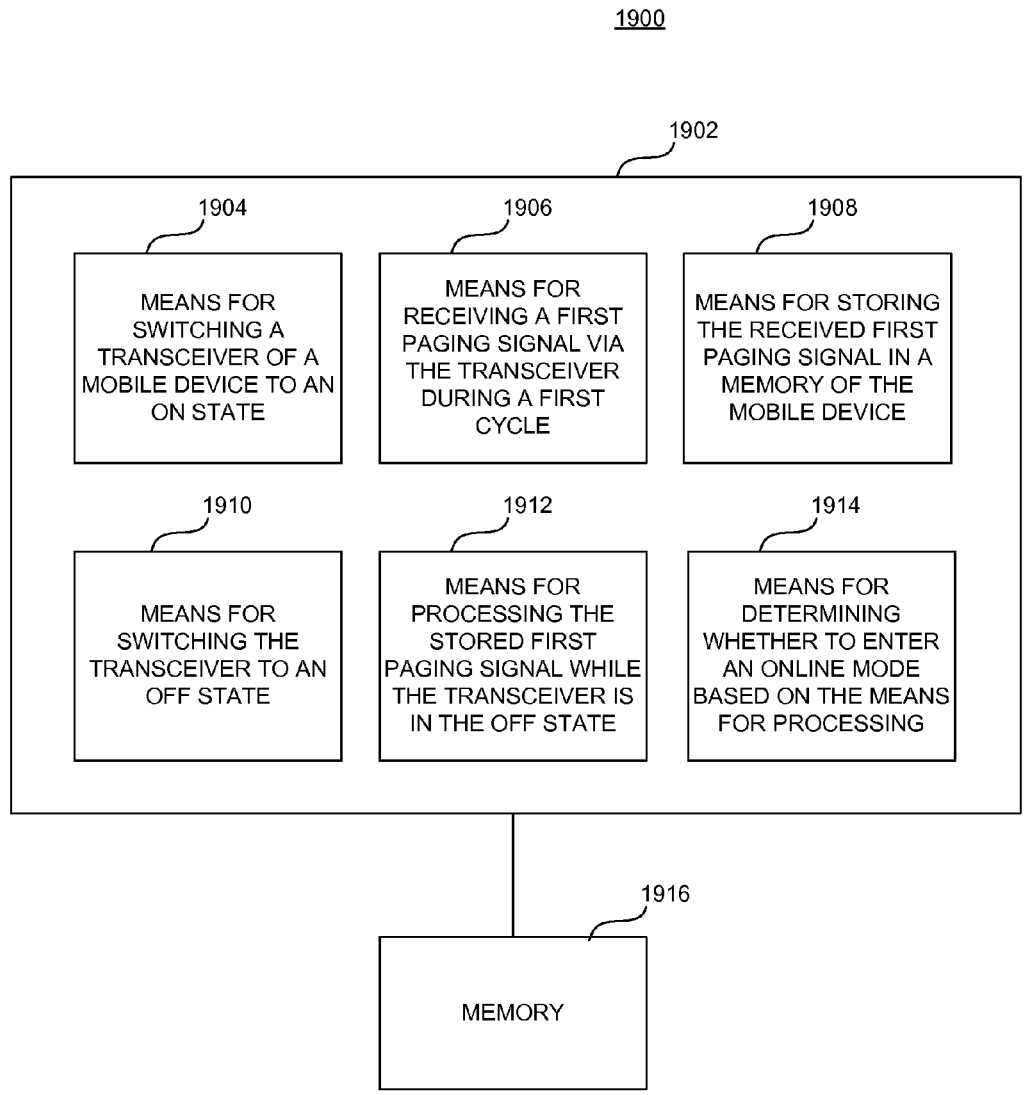
FIG. 19 is an illustration of an example system that performs offline DRX processing.

FIG. 19 is an illustration of an example system 1900 that performs offline and online DRX processing. For example, system 1900 can reside at least partially within a base station, mobile device, etc. It is to be appreciated that system 1900 is represented as including functional blocks, which can be functional blocks that represent functions implemented by a processor, software, or combination thereof (e.g., firmware). System 1900 includes a logical grouping 1902 of means that can act in conjunction. For instance, logical grouping 1902 can include: means for switching a transceiver of a mobile device to an on state 1904; means for receiving a first paging signal via the transceiver during a first cycle 1906; means for storing the received first paging signal in a memory of the mobile device 1908; means for switching the transceiver to an off state 1910; means for processing the stored first paging signal while the transceiver is in the off state 1912; and means for determining whether to enter an online mode based on the means for processing. Additionally, system 1900 can include a memory 1916 that retains instructions for executing functions associated with the means 1904 through 1914. While shown as being external to memory 1916, it is to be understood that one or more of the means 1904 through 1914 can exist within memory 1916.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for processing signals, comprising:
   switching a transceiver of a mobile device to an on state;
   receiving a first paging signal via the transceiver during a first cycle;
   determining whether to process the first paging signal in a first processing state or a second processing state in response to one or more triggers;
   in response to determining to process the first paging signal in the first processing state:
      storing the received first paging signal in a memory of the mobile device;
      switching the transceiver to an off state;
      processing the stored first paging signal while the transceiver is in the off state;
      determining whether to enter an online mode based on the processing; and
      in response to determining to enter the online mode, determining whether to enter the online mode during the first cycle or during a second cycle that is subsequent to the first cycle, wherein determining to enter the online mode during the first cycle comprises determining to enter the online mode during the first cycle in response to determining at least one condition selected from the group:
         a reference signal received power (RSRP) of a serving cell is less than a threshold of the serving cell,
         the RSRP of the serving cell is less than the threshold of the serving cell and a RSRP of at least one neighbor cell is less than a threshold of the at least one neighbor cell,
         the at least one neighbor cell satisfies an absolute RSRP threshold and a relative RSRP threshold,
         an inter-Radio Access Technologies (inter-RAT) measurement timer of at least one high priority cell has expired, or
         an inter-frequency measurement timer of at least one high priority cell has expired; and
   in response to determining to process the first paging signal in the second processing state, processing the first paging signal while the transceiver is in the on state.

2. The method of claim 1, wherein the processing comprises discontinuous receive (DRX) processing the first paging signal.

3. The method of claim 1, further comprising measuring a strength of a pilot signal of the first paging signal and determining whether to switch the transceiver to the on state based on the measured strength of the pilot signal.

4. The method of claim 3, further comprising conducting a search of an alternative system if the measured strength of the pilot signal does not exceed a threshold.

5. The method of claim 4, wherein the alternative system is a Data Optimized (DO) system, a Global System for Mobile Communications (GSM) system, or a Universal Mobile Telecommunication System (UMTS).

6. The method of claim 1, further comprising:
   in response to determining to enter the online mode during the second cycle:
      reconfiguring the memory from an offline mode of operation to an online mode of operation; and
      entering the online mode during the second cycle.

7. The method of claim 6, further comprising:
   detecting a neighbor cell during the second cycle, wherein the neighbor cell is an asynchronous (ASYNC) frequency division duplex (FDD) long term evolution (LTE) neighbor cell, a synchronous (SYNC) FDD LTE neighbor cell, or a SYNC time division duplex (TDD) LTE neighbor cell;
   performing primary synchronization signal (PSS) processing on the neighbor cell while the transceiver is in the on state; and
   performing secondary synchronization signal (SSS) processing on the neighbor cell while the transceiver is in the off state.

8. The method of claim 7, wherein a duration of the PSS processing of the SYNC FDD LTE neighbor cell and the SYNC TDD LTE neighbor cell is less than the duration of the PSS processing of the ASYNC FDD LTE neighbor cell.

9. The method of claim 1, further comprising:
   in response to the determination to enter the online mode during the first cycle based on determining that the RSRP of the serving cell is less than the threshold of the serving cell and that the RSRP of at least one neighbor cell is less than the threshold of the at least one neighbor cell, switching the transceiver of the mobile device to the on state during the first cycle; and
   performing neighbor cell detection.

10. The method of claim 1, further comprising:
    in response to the determination to enter the online mode during the first cycle based on determining that the at least one neighbor cell satisfies the absolute RSRP threshold and the relative RSRP threshold, switching the transceiver of the mobile device to the on state prior to receiving a neighbor paging signal of the neighbor cell;
performing time domain (TD) sample capture of the neighbor paging signal;
switching the transceiver of the mobile device to the off state; and
initializing neighbor broadcast channel (NBCH) processing.

11. The method of claim 1, further comprising:
in response to the determination to enter the online mode during the first cycle based on determining that the RSRP of the serving cell is less than the threshold of the serving cell, switching the transceiver of the mobile device to the on state during the first cycle;
tuning the transceiver to a Radio Access Technologies (RAT) frequency; and
performing inter-RAT measurements.

12. The method of claim 1, further comprising:
in response to the determination to enter the online mode during the first cycle based on determining that the inter-RAT measurement timer of the at least one high priority cell has expired, switching the transceiver of the mobile device to the on state during the first cycle;
tuning the transceiver to a Radio Access Technologies frequency; and
performing inter-RAT measurements.

13. The method of claim 1, further comprising:
reconfiguring the memory from an offline mode of operation to an online mode of operation;
in response to the determination to enter the online mode during the first cycle based on determining that the RSRP of the serving cell is less than the threshold of the serving cell, switching the transceiver of the mobile device to the on state during the first cycle;
tuning the transceiver to a predetermined frequency; and
performing inter-frequency measurements.

14. The method of claim 1, further comprising:
reconfiguring the memory from an offline mode of operation to an online mode of operation;
in response to the determination to enter the online mode during the first cycle based on determining that the inter-frequency measurement timer of the at least one high priority cell has expired, switching the transceiver of the mobile device to the on state during the first cycle;
tuning the transceiver to a predetermined frequency; and
performing inter-frequency measurements.

15. A wireless communication apparatus, comprising:
a transceiver configured to receive a first paging signal during a first cycle;
a memory; and
a processor configured to:
store the received first paging signal in the memory;
switch the transceiver to an off state after the first paging signal is stored in the memory;
determine whether to process the first paging signal in a first processing state or a second processing state in response to one or more triggers;
in response to determining to process the first paging signal in the first processing state:
process the stored first paging signal while the transceiver is in the off state;
determine whether to enter an online mode based on the processing; and
in response to determining to enter the online mode, determining whether to enter the online mode during the first cycle or during a second cycle that is subsequent to the first cycle, wherein determining to enter the online mode during the first cycle comprises determining to enter the online mode during the first cycle in response to determining at least one condition selected from the group:
a reference signal received power (RSRP) of a serving cell is less than a threshold of the serving cell,
the RSRP of the serving cell is less than the threshold of the serving cell and a RSRP of at least one neighbor cell is less than a threshold of the at least one neighbor cell,
the at least one neighbor cell satisfies an absolute RSRP threshold and a relative RSRP threshold,
an inter-Radio Access Technologies (inter-RAT) measurement timer of at least one high priority cell has expired, or
an inter-frequency measurement timer of at least one high priority cell has expired; and
in response to determining to process the first paging signal in the second processing state, processing the first paging signal while the transceiver is in the on state.

16. The wireless communication apparatus of claim 15, wherein the processor is further configured to perform discontinuous receive (DRX) processing on the first paging signal.

17. The wireless communication apparatus of claim 15, wherein the processor is further combined to measure a strength of a pilot signal of the first paging signal and determine whether to switch the transceiver to an on state based on the measured strength of the pilot signal.

18. The wireless communication apparatus of claim 17, wherein the processor is further configured to conduct a search of an alternative system if the measured strength of the pilot signal does not exceed a threshold.

19. The wireless communication apparatus of claim 18, wherein the alternative system is a Data Optimized (DO) system, a Global System for Mobile Communications (GSM) system, or a Universal Mobile Telecommunication System (UMTS).

20. The wireless communication apparatus of claim 15, wherein the processor is further configured to:
in response to determining to enter the online mode during the second cycle:
reconfigure the memory from an offline mode of operation to an online mode of operation; and
enter the online mode during the second cycle.

21. The wireless communication apparatus of claim 20, wherein the processor is further configured to:
detect a neighbor cell during the second cycle, wherein the neighbor cell is an asynchronous (ASYNC) frequency division duplex (FDD) long term evolution (LTE) neighbor cell, a synchronous (SYNC) FDD LTE neighbor cell, or a SYNC time division duplex (TDD) LTE neighbor cell;
perform primary synchronization signal (PSS) processing on the neighbor cell while the transceiver is in the on state; and
perform secondary synchronization signal (SSS) processing on the neighbor cell while the transceiver is in the off state.

22. The wireless communication apparatus of claim 21, wherein a duration of the PSS processing of the SYNC FDD LTE neighbor cell and the SYNC TDD LTE neighbor cell is less than the duration of the PSS processing of the ASYNC FDD LTE neighbor cell.

23. The wireless communication apparatus of claim 15, wherein the processor is further configured to:
in response to the determination to enter the online mode during the first cycle based on determining that the RSRP of the serving cell is less than the threshold of the serving cell and that the RSRP of at least one neighbor cell is less than the threshold of the at least one neighbor cell, switch the transceiver to the on state during the first cycle in response to the determination to enter the online mode during the first cycle; and
perform neighbor cell detection.

24. The wireless communication apparatus of claim 15, wherein the processor is further configured to:
in response to the determination to enter the online mode during the first cycle based on determining that the at least one neighbor cell satisfies the absolute RSRP threshold and the relative RSRP threshold, switch the transceiver to the on state prior to receiving a neighbor paging signal of the neighbor cell;
perform time domain (TD) sample capture of the neighbor paging signal;
switch the transceiver to the off state; and
initialize neighbor broadcast channel (NBCH) processing.

25. The wireless communication apparatus of claim 15, wherein the processor is further configured to:
switch the transceiver to the on state during the first cycle in response to the determination to enter the online mode during the first cycle based on determining that the RSRP of the serving cell is less than the threshold of the serving cell;
tune the transceiver to a Radio Access Technologies (RAT) frequency; and
perform inter-RAT measurements.

26. The wireless communication apparatus of claim 15, wherein the processor is further configured to:
switch the transceiver to the on state during the first cycle in response to the determination to enter the online mode during the first cycle based on determining that the inter-RAT measurement timer of the at least one high priority cell has expired;
tune the transceiver to a Radio Access Technologies frequency; and
perform inter-RAT measurements.

27. The wireless communication apparatus of claim 15, wherein the processor is further configured to:
reconfigure the memory from an offline mode of operation to an online mode of operation;
switch the transceiver to the on state during the first cycle in response to the determination to enter the online mode during the first cycle based on determining that the RSRP of the serving cell is less than the threshold of the serving cell;
tune the transceiver to a predetermined frequency; and
perform inter-frequency measurements.

28. The wireless communication apparatus of claim 15, wherein the processor is further configured to:
reconfigure the memory from an offline mode of operation to an online mode of operation;
in response to the determination to enter the online mode during the first cycle based on determining that the inter-frequency measurement timer of the at least one high priority cell has expired, switch the transceiver to the on state during the first cycle;
tune the transceiver to a predetermined frequency; and
perform inter-frequency measurements.

29. An apparatus, comprising:
means for switching a transceiver of a mobile device to an on state;
means for receiving a first paging signal via the transceiver during a first cycle;
means for storing the received first paging signal in a memory of the mobile device;
means for determining whether to process the first paging signal in a first processing state or a second processing state in response to one or more triggers;
means for switching the transceiver to an off state in response to determining to process the first paging signal in the first processing state;
means for processing the stored first paging signal while the transceiver is in the off state in response to determining to process the first paging signal in the first processing state;
means for determining whether to enter an online mode based on the means for processing in response to determining to process the first paging signal in the first processing state;
means for determining whether to enter the online mode during the first cycle or during a second cycle that is subsequent to the first cycle in response to determining to enter the online mode in response to determining to process the first paging signal in the first processing state, wherein the means for determining to enter the online mode during the first cycle comprises means for determining to enter the online mode during the first cycle in response to determining at least one condition selected from the group:
a reference signal received power (RSRP) of a serving cell is less than a threshold of the serving cell,
the RSRP of the serving cell is less than the threshold of the serving cell and a RSRP of at least one neighbor cell is less than a threshold of the at least one neighbor cell,
the at least one neighbor cell satisfies an absolute RSRP threshold and a relative RSRP threshold,
an inter-Radio Access Technologies (inter-RAT) measurement timer of at least one high priority cell has expired, or
an inter-frequency measurement timer of at least one high priority cell has expired; and
means for processing the first paging signal while the transceiver is in the on state in response to determining to process the first paging signal in the second processing state.

30. A non-transitory computer-readable medium storing instructions that, when executed by a processor, cause the processor to:
switch a transceiver of a mobile device to an on state;
receive a first paging signal via the transceiver during a first cycle;
store the received first paging signal in a memory of the mobile device;
determine whether to process the first paging signal in a first processing state or a second processing state in response to one or more triggers;
in response to determining to process the first paging signal in the first processing state:
switch the transceiver to an off state;
process the stored first paging signal while the transceiver is in the off state;

determine whether to enter an online mode based on the processing; and in response to determining to enter the online mode, determining whether to enter the online mode during the first cycle or during a second cycle that is subsequent to the first cycle, wherein determining to enter the online mode during the first cycle comprises determining to enter the online mode during the first cycle in response to determining at least one condition selected from the group:
- a reference signal received power (RSRP) of a serving cell is less than a threshold of the serving cell,
- the RSRP of the serving cell is less than the threshold of the serving cell and a RSRP of at least one neighbor cell is less than a threshold of the at least one neighbor cell,
- the at least one neighbor cell satisfies an absolute RSRP threshold and a relative RSRP threshold,
- an inter-Radio Access Technologies (inter-RAT) measurement timer of at least one high priority cell has expired, or
- an inter-frequency measurement timer of at least one high priority cell has expired; and in response to determining to process the first paging signal in the second processing state, processing the first paging signal while the transceiver is in the on state.

31. A wireless communications apparatus, comprising:
at least one processor configured to:
- switch a transceiver of a mobile device to an on state;
- receive a first paging signal via the transceiver during a first cycle;
- store the received first paging signal in a memory of the mobile device;
- determine whether to process the first paging signal in a first processing state or a second processing state in response to one or more triggers;
- in response to determining to process the first paging signal in the first processing state:
  - switch the transceiver to an off state;
  - process the stored first paging signal while the transceiver is in the off state;
  - determine whether to enter an online mode based on the processing; and
- determine whether to enter the online mode during the first cycle or during a second cycle that is subsequent to the first cycle in response to determining to enter the online mode, wherein determining to enter the online mode during the first cycle comprises determining to enter the online mode during the first cycle in response to determining at least one condition selected from the group:
  - a reference signal received power (RSRP) of a serving cell is less than a threshold of the serving cell,
  - the RSRP of the serving cell is less than the threshold of the serving cell and a RSRP of at least one neighbor cell is less than a threshold of the at least one neighbor cell,
  - the at least one neighbor cell satisfies an absolute RSRP threshold and a relative RSRP threshold,
  - an inter-Radio Access Technologies (inter-RAT) measurement timer of at least one high priority cell has expired, or
  - an inter-frequency measurement timer of at least one high priority cell has expired; and
- in response to determining to process the first paging signal in the second processing state, processing the first paging signal while the transceiver is in the on state.

32. The method of claim 1, wherein processing the first paging signal in the first processing state comprises determining to transition to the second processing state during the processing of the stored first paging signal while the transceiver is in the off state.

33. The method of claim 1, wherein the one or more triggers comprise a panic mode trigger for cell detection.

34. The method of claim 1, wherein the one or more triggers comprise a neighbor demodulation trigger.

35. The method of claim 1, wherein the one or more triggers comprise an inter-radio access technology (RAT) measurement trigger or an inter-frequency measurement trigger.

* * * * *